United States Patent
Yokoyama et al.

(10) Patent No.: US 10,244,487 B2
(45) Date of Patent: Mar. 26, 2019

(54) WIRELESS INFORMATION DISTRIBUTION APPARATUS, CONTROL METHOD FOR WIRELESS INFORMATION DISTRIBUTION APPARATUS, AND NON-TRANSITORY COMPUTER READABLE MEDIUM STORING CONTROL PROGRAM

(71) Applicant: MITSUBISHI ELECTRIC CORPORATION, Chiyoda-ku, Tokyo (JP)

(72) Inventors: Yosuke Yokoyama, Tokyo (JP); Yukitoshi Inaba, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/768,585

(22) PCT Filed: Oct. 21, 2015

(86) PCT No.: PCT/JP2015/079731
§ 371 (c)(1),
(2) Date: Apr. 16, 2018

(87) PCT Pub. No.: WO2017/068668
PCT Pub. Date: Apr. 27, 2017

(65) Prior Publication Data
US 2018/0310256 A1 Oct. 25, 2018

(51) Int. Cl.
*H04W 52/28* (2009.01)
*H04H 20/38* (2008.01)
(Continued)

(52) U.S. Cl.
CPC ........ *H04W 52/282* (2013.01); *H04B 17/318* (2015.01); *H04H 20/12* (2013.01);
(Continued)

(58) Field of Classification Search
CPC ......... H04W 52/00–52/60; H04W 4/04; H04B 17/318; H04H 20/12; H04H 20/38; H04H 60/54
See application file for complete search history.

(56) References Cited

U.S. PATENT DOCUMENTS 7,142,694 B2   11/2006 Hashimoto et al.
8,487,478 B2   7/2013 Kirby et al.
(Continued)

FOREIGN PATENT DOCUMENTS

JP   H08-022496 A   1/1996
JP   2002-325082 A   11/2002
(Continued)

OTHER PUBLICATIONS

International Search Report (PCT/ISA/210) dated Jan. 12, 2016, by the Japanese Patent Office as the International Searching Authority for International Application No. PCT/JP2015/079731.
(Continued)

*Primary Examiner* — Raymond S Dean
(74) *Attorney, Agent, or Firm* — Buchanan Ingersoll & Rooney PC

(57) ABSTRACT

In a wireless information distribution apparatus, a transmission unit transmits radio waves for distributing information. An adjustment unit acquires first data indicating a degree in which a person is present around the wireless information distribution apparatus. Moreover, the adjustment unit acquires second data serving as an index of a possibility that another apparatus that distributes information by radio waves is present around the wireless information distribution apparatus. The adjustment unit adjusts, based on the first data and the second data, the intensity of the radio waves to be transmitted by the transmission unit.

17 Claims, 18 Drawing Sheets

(51) Int. Cl.
*H04W 4/04* (2009.01)
*H04W 52/34* (2009.01)
*H04H 20/12* (2008.01)
*H04B 17/318* (2015.01)
*H04H 60/54* (2008.01)

(52) U.S. Cl.
CPC .............. *H04H 20/38* (2013.01); *H04W 4/04* (2013.01); *H04W 52/283* (2013.01); *H04W 52/34* (2013.01); *H04W 52/346* (2013.01); *H04H 60/54* (2013.01)

(56) References Cited

U.S. PATENT DOCUMENTS

| | | |
|---|---|---|
| 8,611,815 B2 | 12/2013 | Mohammadian et al. |
| 8,629,650 B2 | 1/2014 | Mohammadian et al. |
| 8,849,337 B2 | 9/2014 | Chande et al. |
| 8,892,035 B2 | 11/2014 | Mohammadian et al. |
| 8,965,461 B2 | 2/2015 | Toncich et al. |
| 9,130,407 B2 | 9/2015 | Toncich et al. |
| 9,178,387 B2 | 11/2015 | Mohammadian et al. |
| 9,184,632 B2 | 11/2015 | Kirby et al. |
| 9,190,875 B2 | 11/2015 | Mohammadian |
| 9,236,771 B2 | 1/2016 | Toncich et al. |
| 2005/0013488 A1 | 1/2005 | Hashimoto et al. |
| 2009/0284082 A1 | 11/2009 | Mohammadian |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2010/0201202 A1 | 8/2010 | Kirby et al. |
| 2012/0046026 A1 | 2/2012 | Chande et al. |
| 2012/0153731 A9 | 6/2012 | Kirby et al. |
| 2013/0300358 A1 | 11/2013 | Kirby et al. |
| 2014/0103881 A1 | 4/2014 | Mohammadian et al. |
| 2015/0011254 A1 | 1/2015 | Chande et al. |
| 2015/0171636 A1 | 6/2015 | Toncich et al. |
| 2015/0372503 A1 | 12/2015 | Toncich et al. |

FOREIGN PATENT DOCUMENTS

| | | |
|---|---|---|
| JP | 2009-124461 A | 6/2009 |
| JP | 2009-199527 A | 9/2009 |
| JP | 2010-130222 A | 6/2010 |
| JP | 2010-233430 A | 10/2010 |
| JP | 2012-104993 A | 5/2012 |
| JP | 2013-520932 A | 6/2013 |
| JP | 2014-030349 A | 2/2014 |
| JP | 2014-112869 A | 6/2014 |
| WO | WO 2004/012142 A1 | 2/2004 |

OTHER PUBLICATIONS

Written Opinion (PCT/ISA/237) dated Jan. 12, 2016, by the Japanese Patent Office as the International Searching Authority for International Application No. PCT/JP2015/079731.

| REACHABLE DISTANCE OF RADIO WAVES | INTENSITY OF RADIO WAVES |
|---|---|
| 1m | x₁dB |
| 2m | x₂dB |
| ... | ... |

401

WIRELESS INFORMATION DISTRIBUTION APPARATUS, CONTROL METHOD FOR WIRELESS INFORMATION DISTRIBUTION APPARATUS, AND NON-TRANSITORY COMPUTER READABLE MEDIUM STORING CONTROL PROGRAM

TECHNICAL FIELD

The present invention relates to a wireless information distribution apparatus, a control method for a wireless information distribution apparatus, and a control program.

BACKGROUND ART

There are wireless information distribution apparatuses which perform information distribution by wireless to surrounding wireless terminals. Some of the wireless information distribution apparatuses have the function to distribute information toward only wireless terminals located within a given distance. Such wireless information distribution apparatuses are installed in, for example, movable bodies of public transportation, such as trains and buses, or facilities of public transportation, such as train platforms and bus stops, and are used to provide guidance information to only nearby passengers.

To actually distribute information to only wireless terminals located within a given distance, it is necessary to adjust a reachable distance of radio waves used for wireless communication to become constant. However, since radio waves are absorbed by persons, to make the reachable distance of radio waves constant, it is necessary to adjust a transmitted radio wave intensity corresponding to the number of persons present around the wireless information distribution apparatus.

There is a traditional technique to estimate the number of persons around an apparatus which transmits information by wireless and to increase transmitted power when the number of persons is large and decrease transmitted power when the number of persons is small (for example, see Patent Literature 1).

CITATION LIST

Patent Literature

Patent Literature 1: JP 8-22496 A

SUMMARY OF INVENTION

Technical Problem

The reachable distance of radio waves varies according to not only the number of persons around a wireless information distribution apparatus but also conditions such as the physical frame and posture of a person who absorbs radio waves or the presence of an object which reflects or absorbs radio waves. Moreover, in a case where persons around a wireless information distribution apparatus are unevenly distributed, the reachable distance of radio waves in a direction toward an area in which the density of persons is high becomes small and the reachable distance of radio waves in a direction toward an area in which the density of persons is low becomes large.

The traditional technique is unable to eliminate variations of the reachable distance of radio waves caused by various factors such as those described above.

A problem may arise in which, when the wireless information distribution apparatus is unable to make the reachable distance of radio waves constant and the reachable distance of radio waves becomes smaller than the intended one, radio waves become unable to reach a wireless terminal to which information is to be distributed. To avoid such a problem, it is possible to take measures to set the transmitted radio wave intensity to a somewhat high value. For example, if the intended reachable distance of radio waves is 10 meters, transmitting radio waves having such an intensity that the reachable distance of radio waves becomes 15 meters when no persons are present around the wireless information distribution apparatus facilitates attaining the intended reachable distance of radio waves even when a person or persons are present around the wireless information distribution apparatus. However, in that case, it becomes highly possible that a different problem arises as follows.

When a plurality of wireless information distribution apparatuses, which is installed at respective locations, distributes respective different pieces of information, a wireless terminal may in some cases simultaneously receive information from two or more wireless information distribution apparatuses. In such a case, it is common that the wireless terminal selects information transmitted by the strongest radio waves as information transmitted from the closest wireless information distribution apparatus and outputs the selected information onto, for example, a screen. However, the transmitted radio wave intensity of radio waves transmitted from a wireless information distribution apparatus which is not really the closest one may become strong due to variations of the reachable distance of radio waves, so that information transmitted from that wireless information distribution apparatus may be erroneously selected. Thus, there is a possibility that information distribution performed by a wireless information distribution apparatus may hinder information distribution performed by another wireless information distribution apparatus. In a case where the above-mentioned measures to set the transmitted radio wave intensity to a somewhat high value are taken, the reachable distance of radio waves would become large. Therefore, the possibility that information distribution performed by a wireless information distribution apparatus may hinder information distribution performed by another wireless information distribution apparatus would become higher.

An object of the invention is to make information distribution performed by a wireless information distribution apparatus unlikely to hinder information distribution performed by another wireless information distribution apparatus.

Solution to Problem

A wireless information distribution apparatus according to one aspect of the present invention distributes information to a surrounding wireless terminal by radio waves.

The wireless information distribution apparatus includes:
a transmission unit to transmit radio waves for distributing information; and
an adjustment unit to acquire first data indicating a degree in which a person is present around and second data serving as an index of a possibility that an other apparatus that distributes information by radio waves is present around, and to adjust, based on the first data and the second data, an intensity of radio waves to be transmitted by the transmission unit.

Advantageous Effects of Invention

In the invention, the transmitted radio wave intensity of a wireless information distribution apparatus is adjusted based on not only a degree in which a person is present around the wireless information distribution apparatus but also an index of possibility that another apparatus which distributes information by radio waves is present around the wireless information distribution apparatus. Therefore, according to the invention, information distribution performed by a wireless information distribution apparatus is made unlikely to hinder information distribution performed by another apparatus.

DESCRIPTION OF EMBODIMENTS

Figure 1:
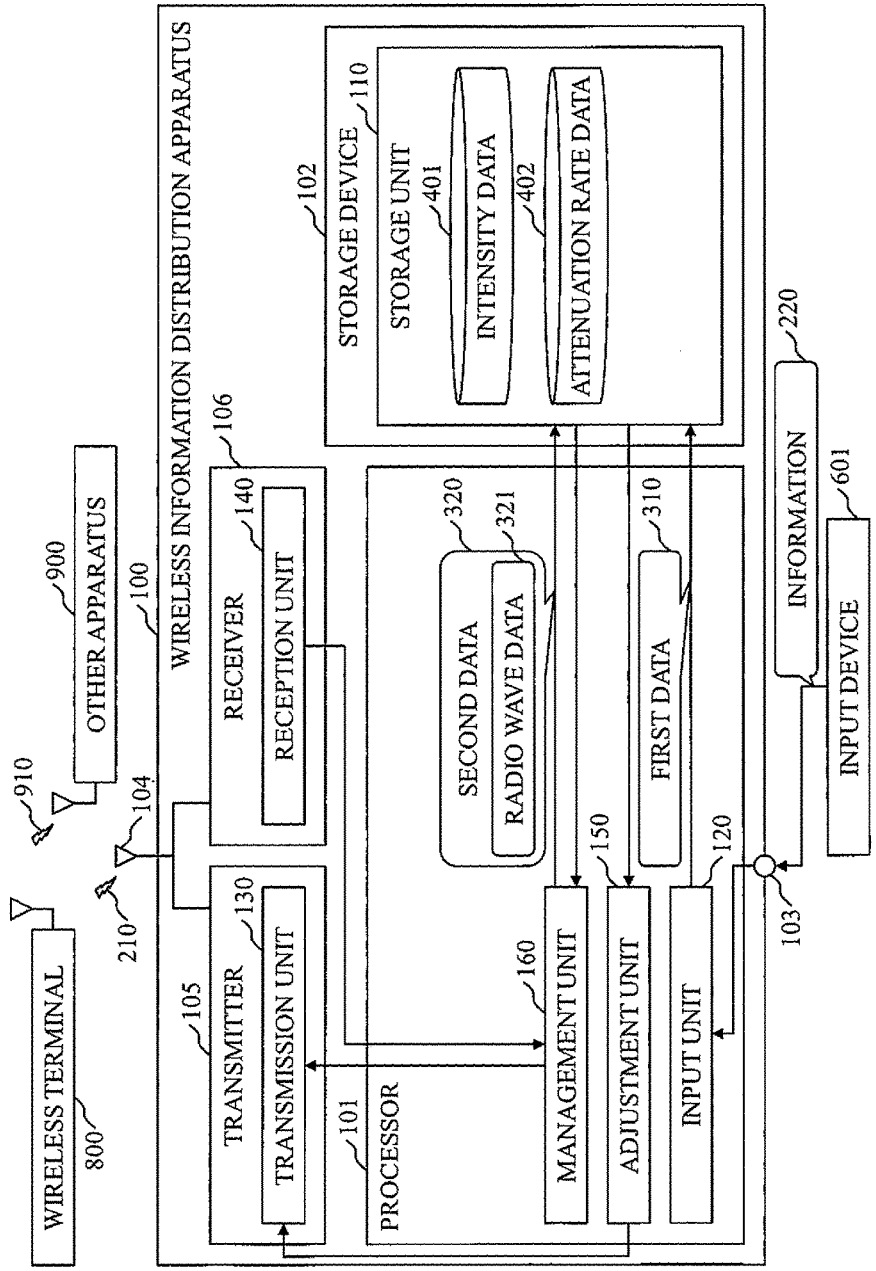
FIG. 1 is a block diagram illustrating a configuration of a wireless information distribution apparatus according to an embodiment 1.

Hereinafter, embodiments of the invention will be described with use of the figures. Furthermore, in the figures, the same or equivalent portions are assigned the respective same reference characters. In the description of embodiments, the description about the same or equivalent portions are omitted or simplified as appropriate.

Embodiment 1

A configuration of an apparatus according to the present embodiment, an operation of the apparatus according to the present embodiment, and an advantageous effect of the present embodiment are described in sequence.

*Description of Configuration*

A configuration of a wireless information distribution apparatus 100 serving as an apparatus according to the present embodiment is described with reference to FIG. 1.

The wireless information distribution apparatus 100 is an apparatus which distributes information 220 to a surrounding wireless terminal 800 by radio waves 210. The wireless information distribution apparatus 100 can be installed at any place at which a person can be present, but, in the present embodiment, is installed in a movable body or a facility of public transportation, as mentioned above. The information 220, which is transmitted by the wireless information distribution apparatus 100, can be any information which is able to be used by a person present around the wireless information distribution apparatus 100, but, in the present embodiment, is guidance information directed to passengers, as mentioned above.

The wireless information distribution apparatus 100 acquires first data 310 indicating a degree in which a person is present around. In the present embodiment, the first data 310 is data indicating the number of persons present around the wireless information distribution apparatus 100. In the present embodiment, regardless of the distribution of persons present around the wireless information distribution apparatus 100, if the number of persons present around the wireless information distribution apparatus 100 is large, the degree in which a person is present around the wireless information distribution apparatus 100 is deemed to be high.

The wireless information distribution apparatus 100 acquires second data 320 serving as an index of the possibility that another apparatus 900 which distributes information by radio waves 910 is present around. In the present embodiment, the second data 320 includes, as data serving as such an index, radio wave data 321 indicating whether the wireless information distribution apparatus 100 has received radio waves 910 from another apparatus 900. In the present embodiment, if the wireless information distribution apparatus 100 has received radio waves 910 from another apparatus 900, the possibility that another apparatus 900 is present around the wireless information distribution apparatus 100 is deemed to be high.

The wireless information distribution apparatus 100 adjusts the intensity of radio waves 210 to be transmitted, based on the first data 310 and the second data 320. A specific adjustment method for the intensity of radio waves 210 is described below. Furthermore, the term "intensity" is assumed to mean a transmitted radio wave intensity except a case where it is mentioned as a received radio wave intensity.

As illustrated in FIG. 1, the wireless information distribution apparatus 100 includes a storage unit 110, an input unit 120, a transmission unit 130, a reception unit 140, an adjustment unit 150, and a management unit 160.

The storage unit 110 stores intensity data 401 and attenuation rate data 402.

Figure 2:
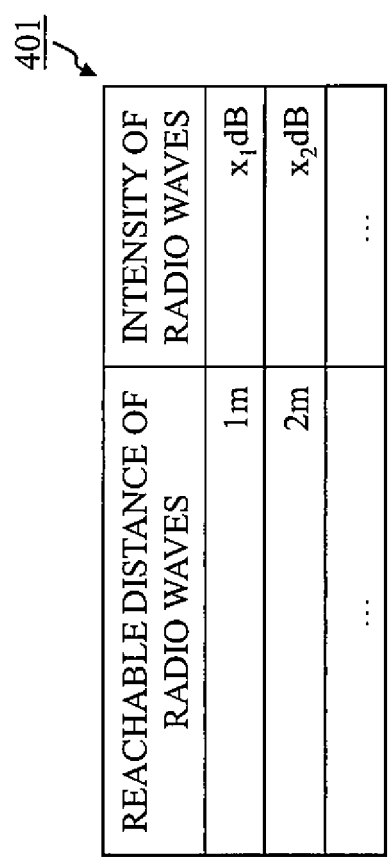
FIG. 2 is a table illustrating an example of intensity data according to the embodiment 1.

The intensity data 401 is data indicating a relationship between the reachable distance of radio waves 210 and the intensity of radio waves 210. As illustrated in FIG. 2, the intensity data 401 is stored in a table format in the present embodiment. The table of the intensity data 401 includes two columns. One column is used to store numerical values of the reachable distance of radio waves 210 which are able to be set in the wireless information distribution apparatus 100. The other column is used to store numerical values of the intensity of radio waves 210 which are required to attain corresponding reachable distances when no persons are present around the wireless information distribution apparatus 100.

Figure 3:
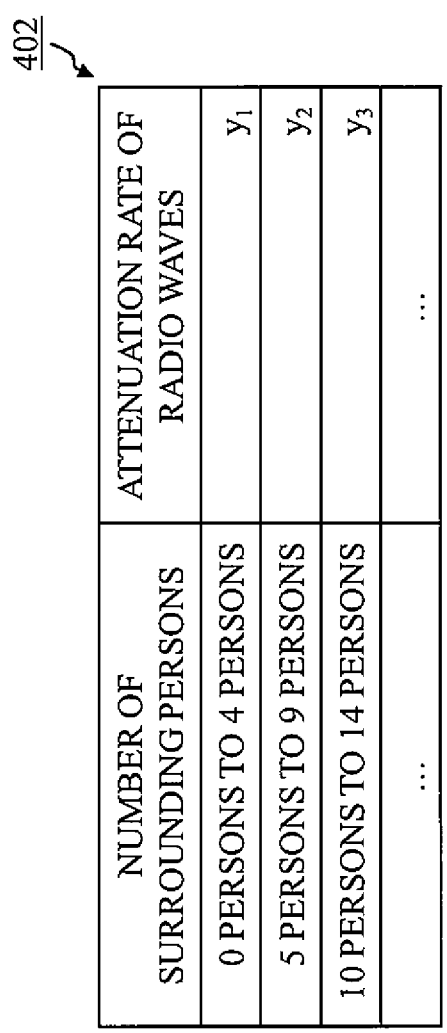
FIG. 3 is a table illustrating an example of attenuation rate data according to the embodiment 1.

The attenuation rate data 402 is data indicating a relationship between the number of persons present around the wireless information distribution apparatus 100 and the attenuation rate of radio waves 210. As illustrated in FIG. 3, the attenuation rate data 402 is stored in a table format in the present embodiment. The table of the attenuation rate data 402 includes two columns. One column is used to store numerical ranges of the number of persons around the wireless information distribution apparatus 100. The other column is used to store numerical values of the attenuation rate of radio waves 210 when corresponding numbers of persons are present. The attenuation rate is a rate at which the reachable distance of radio waves 210 decreases in comparison with a case where no persons are present around the wireless information distribution apparatus 100. As a specific example, when the reachable distance of radio waves 210 decreases by 10%, "0.1" is stored.

In the present embodiment, the wireless information distribution apparatus 100 is a computer. The function concerning control of the wireless information distribution apparatus 100 is implemented by software. In the present embodiment, at least the functions of the input unit 120, the adjustment unit 150, and the management unit 160 are equivalent to the function concerning control of the wireless information distribution apparatus 100.

The wireless information distribution apparatus 100 includes hardware such as a processor 101, a storage device 102, an input interface 103, an antenna 104, a transmitter 105, and a receiver 106. The processor 101 is connected to other pieces of hardware via signal lines, and controls these other pieces of hardware.

The processor 101 is an integrated circuit (IC) which performs processing. Specifically, the processor 101 is a central processing unit (CPU).

The storage device 102 includes an auxiliary storage device and a memory. Specifically, the auxiliary storage device is a read-only memory (ROM), a flash memory, or a hard disk drive (HDD). Specifically, the memory is a random access memory (RAM). The storage unit 110 is implemented by the storage device 102. Specifically, the storage unit 110 is implemented by the memory, but can be implemented by both the auxiliary storage device and the memory.

The input interface 103 is a port configured to be connected to an input device 601 such as a mouse, a keyboard, or a touch panel. Specifically, the input interface 103 is a universal serial bus (USB) terminal. Furthermore, the input interface 103 can be a port configured to be connected to a local area network (LAN).

The wireless information distribution apparatus 100 can include a display as hardware. Specifically, the display is a liquid crystal display (LCD).

The transmitter 105 transmits a signal via the antenna 104. The receiver 106 receives a signal via the antenna 104. Specifically, the transmitter 105 and the receiver 106 are individual communication chips or an integrated communication chip. The transmission unit 130 is implemented by the transmitter 105. The reception unit 140 is implemented by the receiver 106.

The auxiliary storage device has a program stored therein which implements the function concerning control of the wireless information distribution apparatus 100. This program is loaded onto the memory, read by the processor 101, and executed by the processor 101. The auxiliary storage device also has an operating system (OS) stored therein. At least a part of the OS is loaded onto the memory, and the processor 101 executes the program which implements the function concerning control of the wireless information distribution apparatus 100 while executing the OS.

The wireless information distribution apparatus 100 can include only one processor 101 or can include a plurality of processors 101. The plurality of processors 101 can execute the program which implements the function concerning control of the wireless information distribution apparatus 100 in cooperation with each other.

Information, data, signal values, and variable values indicating results of processing performed by the input unit 120, the adjustment unit 150, and the management unit 160 are stored in the auxiliary storage device, the memory, or a register or a cache memory included in the processor 101.

The program which implements the function concerning control of the wireless information distribution apparatus 100 can also be stored in a portable recording medium such as a magnetic disc, a flexible disc, an optical disc, a compact disc, a Blu-ray (registered trademark) disc, or a digital versatile disc (DVD).

*Description of Operation*

An operation of the wireless information distribution apparatus 100, which is an apparatus according to the present embodiment, is described with reference to FIG. 4, FIG. 5, and FIG. 6.

Figure 4:
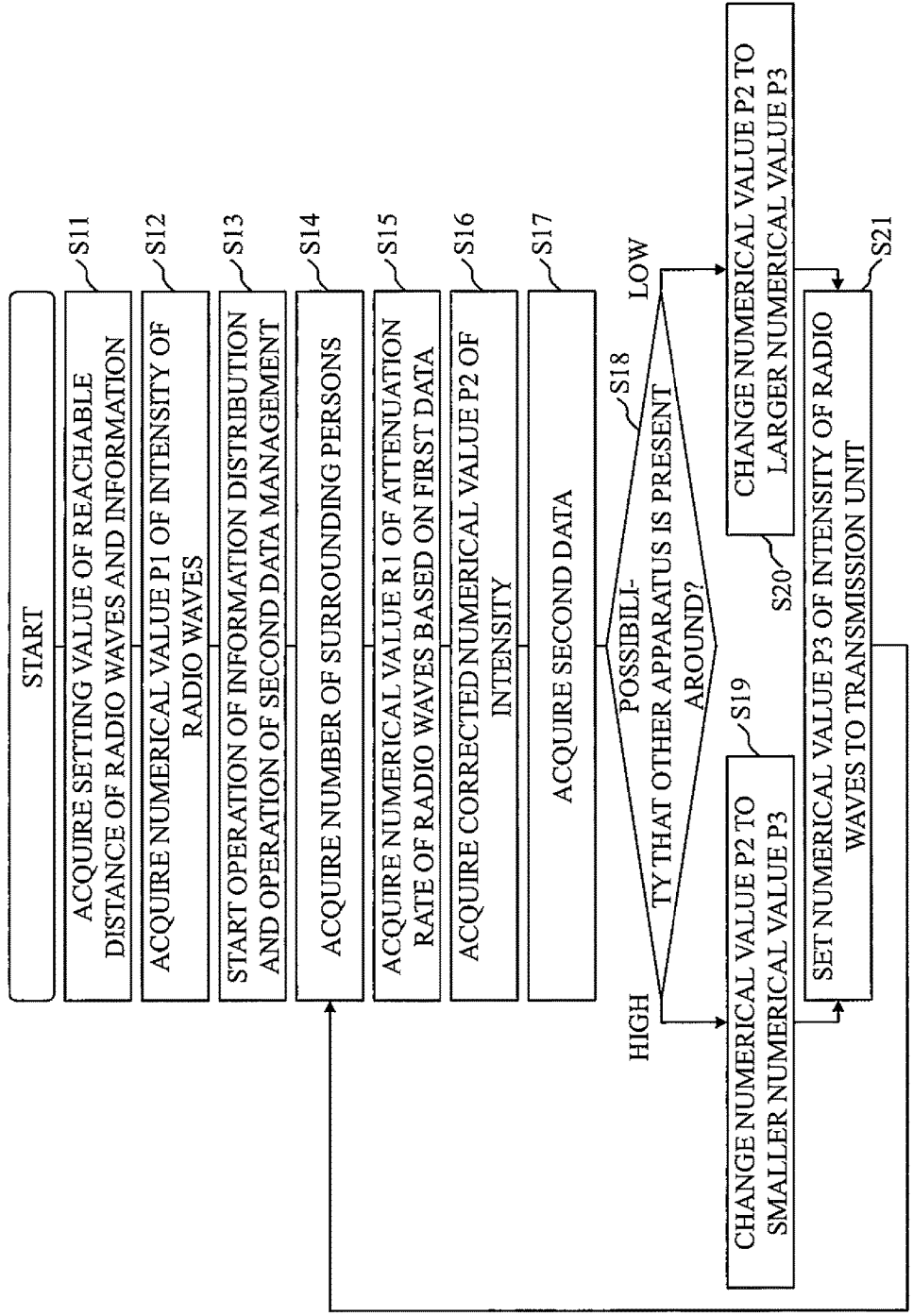
FIG. 4 is a flowchart illustrating an operation of control of the wireless information distribution apparatus according to the embodiment 1.

An operation illustrated in FIG. 4 is an operation of control. An operation illustrated in FIG. 5 is an operation of information distribution. An operation illustrated in FIG. 6 is an operation of second data management. The operation of control is equivalent to a control method for the wireless information distribution apparatus 100 according to the present embodiment and a processing procedure of a control program according to the present embodiment. The operation of information distribution and the operation of second data management are started by the operation of control and, after that, are performed in parallel with the operation of control.

In step S11 illustrated in FIG. 4, the input unit 120 receives inputting of a setting value of the reachable distance of radio waves 210 performed by the user, who is an administrator of the wireless information distribution apparatus 100, from the input device 601 via the input interface 103. Moreover, the input unit 120 receives inputting of the information 220 performed by the user from the input device 601 via the input interface 103. This information 220 is information which the user intends to cause the wireless information distribution apparatus 100 to distribute. The input unit 120 writes the input setting value and the information 220 into the storage unit 110.

In step S12 illustrated in FIG. 4, the adjustment unit 150 acquires the setting value of the reachable distance input to the input unit 120. Specifically, the adjustment unit 150 reads the setting value input in step S11 from the storage unit 110. Then, the adjustment unit 150 refers to the intensity data 401 stored in the storage unit 110 and acquires a numerical value P1 of intensity of radio waves 210 corresponding to the read setting value. The intensity data 401 is assumed to be previously written into the storage unit 110. Furthermore, instead of referring to the intensity data 401, the adjustment unit 150 can calculate the intensity of radio waves 210 using a function with the reachable distance set as a variable, thus acquiring the numerical value P1 of intensity of radio waves 210.

In step S13 illustrated in FIG. 4, the operation of information distribution and the operation of second data management are started. When the operation of information distribution is started, the adjustment unit 150 sets the intensity of radio waves 210 to be transmitted by the transmission unit 130 to the numerical value P1 acquired in step S12. Furthermore, the operation of second data management can be started prior to step S13.

First, the operation of information distribution is described.

Figure 5:
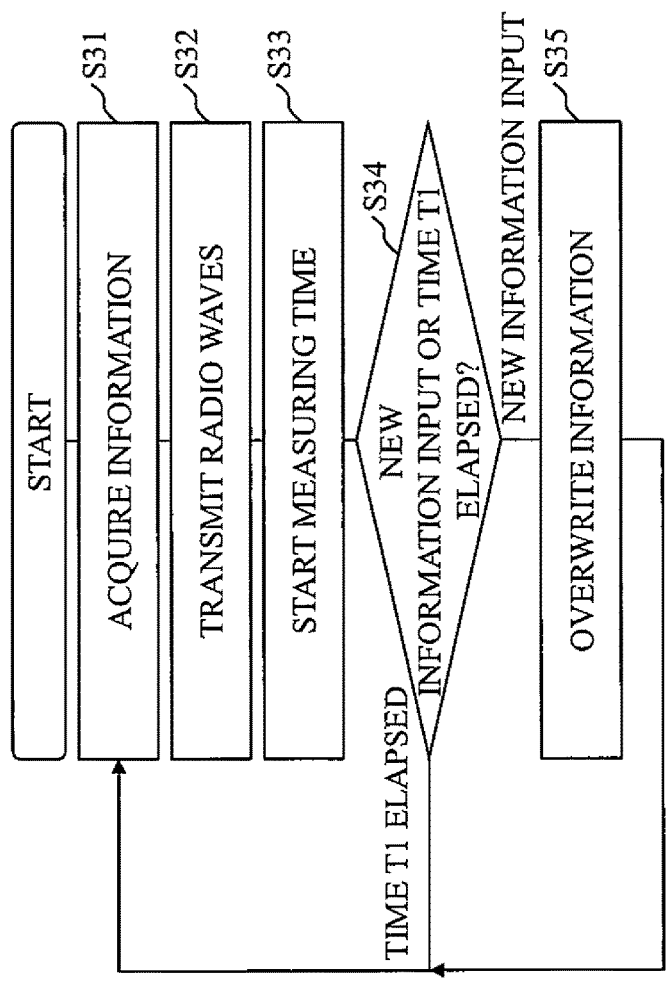
FIG. 5 is a flowchart illustrating an operation of information distribution of the wireless information distribution apparatus according to the embodiment 1.

In step S31 illustrated in FIG. 5, the management unit 160 acquires the information 220 input to the input unit 120. Specifically, the management unit 160 reads the information 220 input in step S11 or information 220 overwritten in step S35 described below from the storage unit 110. Then, the management unit 160 inputs the acquired information 220 to the transmission unit 130.

In step S32 illustrated in FIG. 5, the transmission unit 130 encodes the information 220 input in step S31 to generate a digital signal including the information 220. The transmission unit 130 converts the generated digital signal into an analog signal. The transmission unit 130 modulates carrier waves with the analog signal to generate radio waves 210 used to distribute the information 220. The transmission unit 130 transmits the generated radio waves 210 to around the wireless information distribution apparatus 100 via the antenna 104. This causes the information 220 to be distributed to a surrounding wireless terminal 800. Furthermore, the term "surrounding" in the expression "surrounding wireless terminal" means a range which the radio waves 210 transmitted from the wireless information distribution apparatus 100 are able to reach.

In step S33 illustrated in FIG. 5, the management unit 160 starts measuring time using a timer function provided by the OS.

In step S34 illustrated in FIG. 5, the management unit 160 waits until the input unit 120 receives inputting of new information 220 performed by the user or until the time measured since step S33 reaches a previously-set time T1. The time T1 can be any time, but is desirably a short fixed time such as several seconds, several tens of seconds, or several minutes. In a case where the input unit 120 has received inputting of new information 220, the management unit 160 resets the time measured since step S33, and the flow then proceeds to step S35. In a case where the time T1 has elapsed without new information 220 being input to the input unit 120, the management unit 160 also resets the time measured since step S33, but the flow then returns to step S31. Furthermore, in this case, the flow can return to step S32. In other words, an operation in step S31 can be omitted.

In step S35 illustrated in FIG. 5, the input unit 120 overwrites the information 220 stored in the storage unit 110 with the input new information 220. After that, the flow returns to step S31.

The operation of information distribution continues until an instruction for ending is input to the input unit 120.

Next, the operation of second data management is described.

Figure 6:
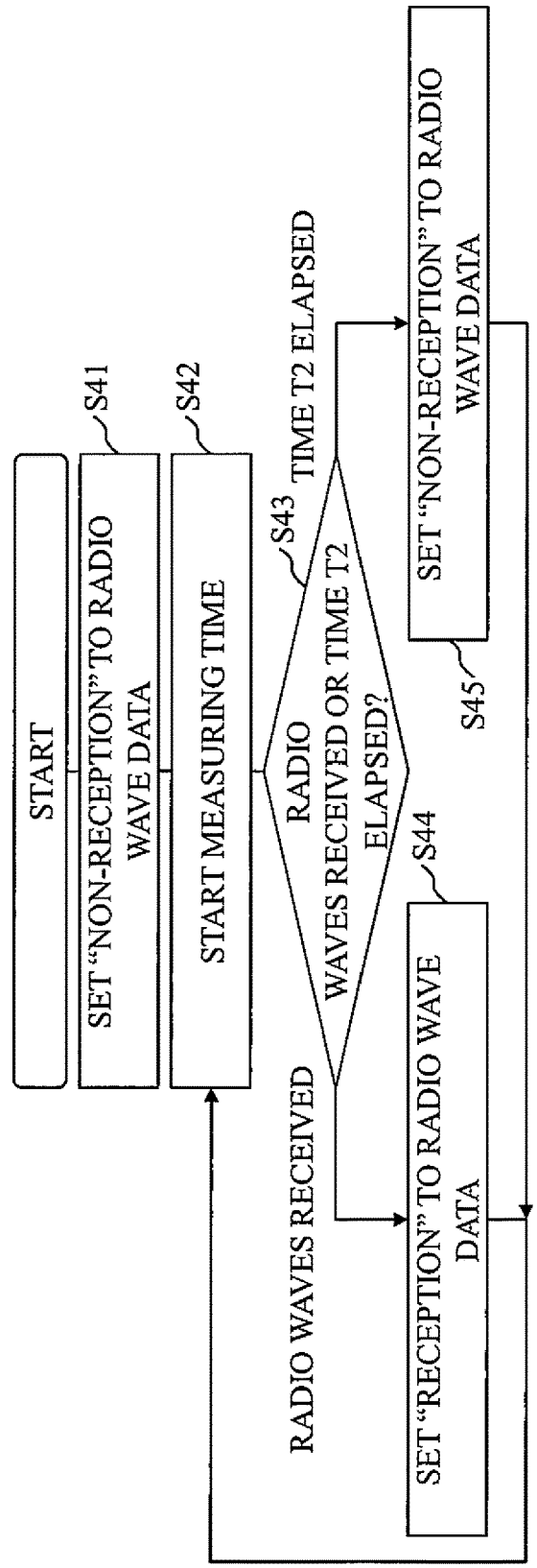
FIG. 6 is a flowchart illustrating an operation of second data management of the wireless information distribution apparatus according to the embodiment 1.

In step S41 illustrated in FIG. 6, the management unit 160 writes, in the storage unit 110, second data 320 including radio wave data 321 indicating, as a default value, that radio waves 910 transmitted from another apparatus 900 are not received by the reception unit 140, in other words, "non-reception". The radio wave data 321 is data indicating whether radio waves 910 transmitted from another apparatus 900 have been received by the reception unit 140.

In step S42 illustrated in FIG. 6, the management unit 160 starts measuring time using a timer function provided by the OS.

In step S43 illustrated in FIG. 6, the management unit 160 waits until the reception unit 140 receives radio waves 910 transmitted from another apparatus 900 or until the time measured since step S42 reaches a previously-set time T2. The time T2 can be any time, but is desirably a fixed time such as several seconds, several tens of seconds, several minutes, several tens of minutes, or several hours. In a case where the reception unit 140 has received radio waves 910 transmitted from another apparatus 900, the management unit 160 resets the time measured since step S42, and the flow then proceeds to step S44. In a case where the time T2 has elapsed without radio waves 910 transmitted from another apparatus 900 being received by the reception unit 140, the management unit 160 also resets the time measured since step S42, but the flow proceeds to step S45.

In step S44 illustrated in FIG. 6, in a case where "non-reception" is indicated by the radio wave data 321 stored in the storage unit 110, the management unit 160 updates the stored radio wave data 321 to radio wave data 321 indicating that radio waves 910 transmitted from another apparatus 900 have been received by the reception unit 140, in other words, "reception". After that, the flow returns to step S42.

In step S45 illustrated in FIG. 6, in a case where "reception" is indicated by the radio wave data 321 stored in the storage unit 110, the management unit 160 updates the stored radio wave data 321 to radio wave data 321 indicating "non-reception". After that, the flow proceeds to step S42.

In the present embodiment, the reception unit 140 receives radio waves via the antenna 104. The reception unit 140 demodulates the received radio waves to generate an analog signal. The reception unit 140 converts the generated analog signal into a digital signal. The reception unit 140 decodes the digital signal to acquire information included in the digital signal and distributed from another apparatus 900. According to whether the information is able to be acquired by the reception unit 140, the management unit 160 is able to discriminate whether radio waves received by the reception unit 140 are the radio waves 910 transmitted from another apparatus 900. Furthermore, the reception unit 140 can omit such processing as demodulation and decoding in a range in which such a discrimination is possible. As a specific example, if a dedicated frequency band is allocated to another apparatus 900, the management unit 160 is able to discriminate, based on frequencies of radio waves received by the reception unit 140, whether the received radio waves are the radio waves 910 transmitted from another apparatus 900. Therefore, such processing as demodulation and decoding by the reception unit 140 becomes unnecessary.

The operation of second data management continues until an instruction for ending is input to the input unit 120.

In step S14 illustrated in FIG. 4, the input unit 120 receives inputting of the number of persons around the wireless information distribution apparatus 100 performed by the user from the input device 601 via the input interface 103. The input unit 120 generates first data 310 indicating the input number of persons, and writes the first data 310 in the storage unit 110. Here, the number of persons to be input can be the number of persons actually counted by the user or can be the number of persons calculated by the user empirically or statistically predicting a variation in the number of persons depending on the day of the week and the hour of the day. Furthermore, it can be optionally determined that the term "around" in such expressions as "persons around" and "the number of persons around" indicates in which directions and up to how long distance a range extends as viewed from the wireless information distribution apparatus 100. In the present embodiment, the term "around" in such expressions as "persons around" and "the number of persons around" is assumed to indicate a circular range extending in all directions and up to the reachable distance input in step S11 as viewed from the wireless information distribution apparatus 100.

In step S15 illustrated in FIG. 4, the adjustment unit 150 acquires the first data 310. Specifically, the adjustment unit 150 reads the first data 310 indicating the number of persons input in step S14 from the storage unit 110. Then, the adjustment unit 150 refers to the attenuation rate data 402 stored in the storage unit 110 to acquire a numerical value R1 of the attenuation rate of radio waves 210 corresponding to the number of persons indicated by the first data 310. The attenuation rate data 402 is assumed to be previously written in the storage unit 110. Furthermore, instead of referring to the attenuation rate data 402, the adjustment unit 150 can calculate the attenuation rate of radio waves 210 using a function with the number of persons set as a variable, thus acquiring the numerical value R1 of the attenuation rate of radio waves 210.

In the example illustrated in FIG. 3, the attenuation rates corresponding to respective degrees are defined in such a manner that, each time the number of persons present around the wireless information distribution apparatus 100 increases by five persons, the degree in which a person is present around the wireless information distribution apparatus 100 is deemed to become larger in a stepwise fashion. In other words, in the present embodiment, the number of persons present around the wireless information distribution apparatus 100 is treated as a number representing the degree in which a person is present around the wireless information distribution apparatus 100. The first data 310 which is acquired in step S15 is data indicating a number representing the degree in this way. Therefore, in the present embodiment, the first data 310 indicating the number of persons present around the wireless information distribution apparatus 100 is equivalent to data indicating the degree in which a person is present around the wireless information distribution apparatus 100.

In step S16 illustrated in FIG. 4, the adjustment unit 150 corrects the numerical value P1 of the intensity of radio waves 210 acquired in step S12 with the numerical value R1 of the attenuation rate of radio waves 210 acquired in step S15, thus acquiring a corrected numerical value P2 of the intensity. The correction is performed in such a manner that the larger the numerical value R1 of the attenuation rate, the larger the numerical value P2 of the intensity becomes. This correction prevents or reduces a variation in the reachable distance caused by a variation in the attenuation rate. The correction of the intensity can be performed by an optional calculation, but, in the present embodiment, is performed by calculating $P2=P1/(1-R1)$.

In step S17 illustrated in FIG. 4, the adjustment unit 150 acquires second data 320. Specifically, the adjustment unit 150 reads, from the storage unit 110, second data 320 including the radio wave data 321 stored or updated by the operation of second data management.

In step S18 illustrated in FIG. 4, in a case where "reception" is indicated by the radio wave data 321, the adjustment unit 150 determines that there is a high possibility that another apparatus 900 is present around the wireless information distribution apparatus 100. After that, the flow proceeds to step S19. On the other hand, in a case where "non-reception" is indicated by the radio wave data 321, the adjustment unit 150 determines that there is a low possibility that another apparatus 900 is present around the wireless information distribution apparatus 100. After that, the flow proceeds to step S20. Specifically, the adjustment unit 150 outputs the content of the radio wave data 321 as a Boolean value. Assuming that a Boolean value corresponding to "reception" is "true", if "true" has been output, this means that the adjustment unit 150 has determined that there is a high possibility that another apparatus 900 is present around the wireless information distribution apparatus 100. On the other hand, if "false" has been output, this means that the adjustment unit 150 has determined that there is a low possibility that another apparatus 900 is present around the wireless information distribution apparatus 100. Furthermore, the term "around" in such an expression as "another apparatus is present around" indicating in which directions and up to how long distance a range extends as viewed from the wireless information distribution apparatus 100 is determined according to how the operation of second data management is performed. In the present embodiment, the term "around" in such an expression as "another apparatus is present around" varies according to radio waves of how much received radio wave intensity the reception unit 140 is able to receive, in other words, the receiving sensitivity of the reception unit 140.

In the present embodiment, whether the possibility that another apparatus 900 is present around the wireless information distribution apparatus 100 is high or low is determined according to whether "reception" is indicated or "non-reception" is indicated by the radio wave data 321. In other words, in the present embodiment, the content of the radio wave data 321 is treated as an index of the possibility that another apparatus 900 is present around the wireless information distribution apparatus 100. The second data 320 which is acquired in step S17 is data including the radio wave data 321 serving as such an index. Therefore, in the present embodiment, the radio wave data 321 indicating whether radio waves 910 transmitted from another apparatus 900 has been received by the reception unit 140 is equivalent to data serving as an index of the possibility that another apparatus 900 is present around the wireless information distribution apparatus 100.

In step S19 illustrated in FIG. 4, the adjustment unit 150 changes the numerical value P2 of the intensity of radio waves 210 acquired in step S16 to a smaller numerical value P3. After that, the flow proceeds to step S21. Changing of the intensity can be performed by an optional calculation, but, in the present embodiment, is performed by calculating P3=P2×0.8.

In step S20 illustrated in FIG. 4, the adjustment unit 150 changes the numerical value P2 of the intensity of radio waves 210 acquired in step S16 to a larger numerical value P3. After that, the flow proceeds to step S21. Changing of the intensity can be performed by an optional calculation, but, in the present embodiment, is performed by calculating P3=P2×1.2.

In step S21 illustrated in FIG. 4, the adjustment unit 150 sets the numerical value P3 of the intensity changed in any one of step S19 and step S20 to the transmission unit 130, thus changing the transmitted radio wave intensity of the wireless information distribution apparatus 100. After that, the flow returns to step S14.

As described above, in the present embodiment, the adjustment unit 150 makes the intensity of radio waves 210 which are transmitted from the transmission unit 130 lower in a case where the radio wave data 321 indicates that radio waves 910 transmitted from another apparatus 900 have been received than in a case where the radio wave data 321 indicates that radio waves 910 transmitted from another apparatus 900 are not received. Therefore, when another apparatus 900 is present near the wireless information distribution apparatus 100, the transmitted radio wave intensity of the wireless information distribution apparatus 100 can be kept low.

As mentioned above, when a plurality of wireless information distribution apparatuses 100 is installed at respective locations and the wireless information distribution apparatuses 100 distribute respective different pieces of information, the wireless terminal 800 may in some cases simultaneously receive information from two or more wireless information distribution apparatuses 100. In the present embodiment, out of such two or more wireless information distribution apparatuses 100, a wireless information distribution apparatus 100 which is second or subsequently closest to the wireless terminal 800 keeps the transmitted radio wave intensity thereof low when having received radio waves 910 from a wireless information distribution apparatus 100 which is closest to the wireless terminal 800, i.e., another apparatus 900. Therefore, the received radio wave intensity of radio waves 910 transmitted from the wireless information distribution apparatus 100 which is closest to the wireless terminal 800 can be made strongest. Accordingly, even if the wireless terminal 800 selects information transmitted by the strongest radio waves as information transmitted from the closest wireless information distribution apparatus 100 and outputs the selected information to, for example, a screen, there is no possibility of information being erroneously selected.

Operations in step S14 and subsequent steps are repeated until the operation of information distribution ends.

In the present embodiment, the first data 310 is data indicating the number of persons present around the wireless information distribution apparatus 100, but can be replaced with data indicating the density of persons present around the wireless information distribution apparatus 100. In that case, the attenuation rate data 402 is replaced with data indicating a relationship between the density of persons present around the wireless information distribution apparatus 100 and the attenuation rate of radio waves 210. Specifically, the attenuation rate data 402 is data in which the attenuation rates corresponding to respective degrees are defined in such a manner that, each time the density of persons present around the wireless information distribution apparatus 100 increases by a given extent, the degree in which a person is present around the wireless information distribution apparatus 100 is deemed to become larger in a stepwise fashion. Therefore, the first data 310 indicating the density of persons present around the wireless information distribution apparatus 100 is also equivalent to data indicating the degree in which a person is present around the wireless information distribution apparatus 100. In step S14, the input unit 120 receives inputting of the density of persons present around the wireless information distribution apparatus 100 performed by the user. In step S15, the adjustment unit 150 acquires the first data 310 indicating the density of persons input in step S14, refers to the attenuation rate data 402, and acquires the numerical value R1 of the attenuation rate of radio waves 210 corresponding to the density of persons indicated by the first data 310. The other operations are the same as those performed in a case where the first data 310 is data indicating the number of persons.

\*\*\*Description of Advantageous Effects of Embodiment\*\*\*

In the present embodiment, the transmitted radio wave intensity of the wireless information distribution apparatus 100 is adjusted based on not only the number of persons present around the wireless information distribution apparatus 100 but also whether the wireless information distribution apparatus 100 has received radio waves 910 transmitted from another apparatus 900. Therefore, according to the present embodiment, information distribution performed by the wireless information distribution apparatus 100 is made unlikely to hinder information distribution performed by another apparatus 900.

In the present embodiment, adjusting the transmitted radio wave intensity of the wireless information distribution apparatus 100 according to the number of persons present around the wireless information distribution apparatus 100 enables preventing or reducing a variation in the reachable distance of radio waves 210. Moreover, in the present embodiment, when there is a high possibility that another apparatus 900 is present around the wireless information distribution apparatus 100, weakening the transmitted radio wave intensity of the wireless information distribution apparatus 100 enables reducing the possibility that the wireless terminal 800 receives strong radio waves 210 and 910 from a plurality of apparatuses. In other words, it enables reducing the possibility that the wireless terminal 800 receives the strongest radio waves 210 from an apparatus which is not the closest apparatus. Therefore, it enables reducing the possibility that an apparatus which is not the closest apparatus is misidentified as the closest apparatus. Moreover, when there is a low possibility that another apparatus 900 is present around the wireless information distribution apparatus 100, strengthening the transmitted radio wave intensity of the wireless information distribution apparatus 100 enables causing radio waves 210 to reliably reach a wireless terminal 800 to which the information 220 is to be distributed.

\*\*\*Other Configurations\*\*\*

While, in the present embodiment, the function concerning control of the wireless information distribution apparatus 100 is implemented by software, as a modification example, the function concerning control of the wireless information distribution apparatus 100 can be implemented by hardware. With regard to this modification example, differences thereof from the present embodiment are mainly described.

Figure 7:
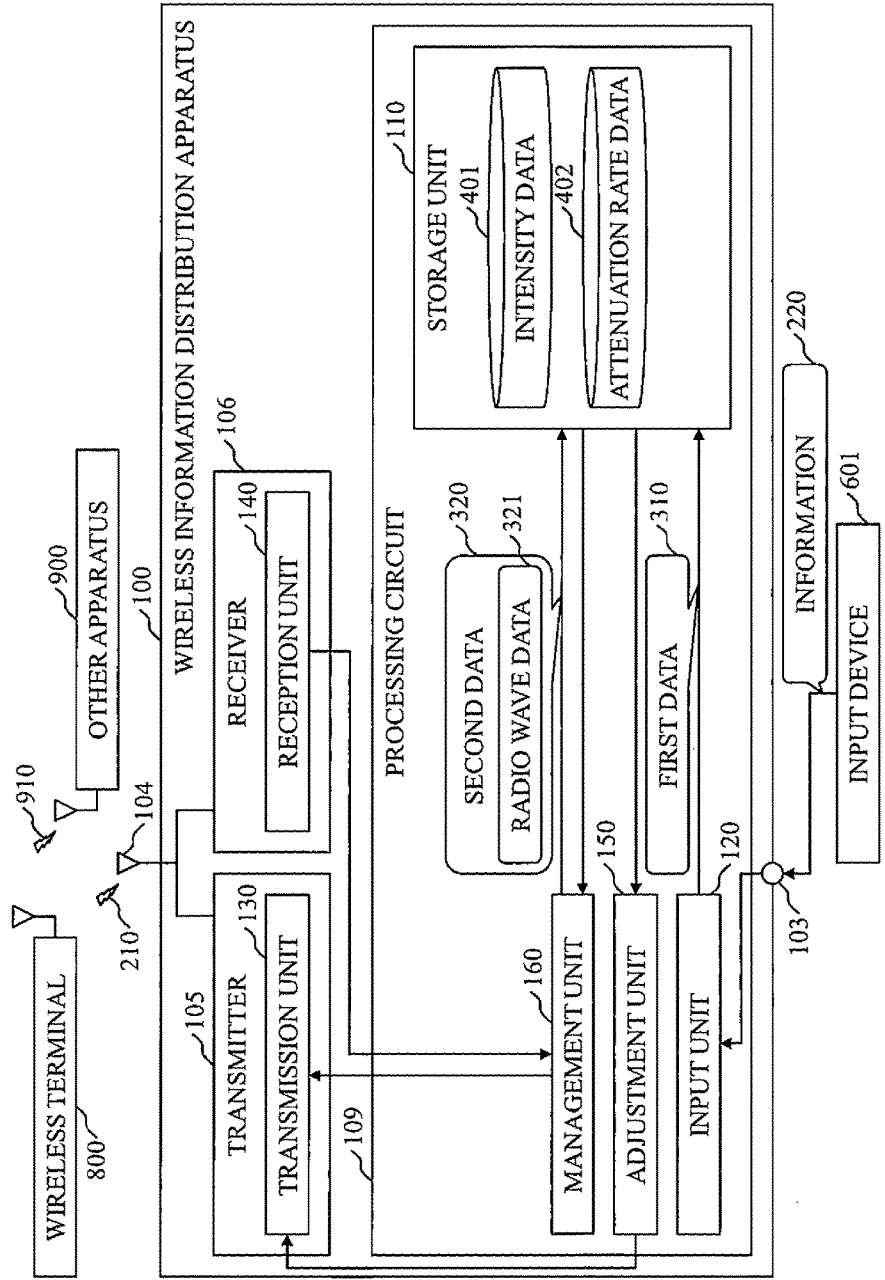
FIG. 7 is a block diagram illustrating a configuration of a wireless information distribution apparatus according to a modification example of the embodiment 1.

A configuration of the wireless information distribution apparatus 100 according to the modification example of the present embodiment is described with reference to FIG. 7.

The wireless information distribution apparatus 100 includes hardware such as a processing circuit 109, an input interface 103, an antenna 104, a transmitter 105, and a receiver 106.

The processing circuit 109 is a dedicated electronic circuit which implements the functions of a storage unit 110, an input unit 120, an adjustment unit 150, and a management unit 160. Specifically, the processing circuit 109 is a single circuit, a composite circuit, a programmed processor, a parallel programmed processor, a logic IC, a gate array (GA), an application specific integrated circuit (ASIC), or a field-programmable gate array (FPGA).

The functions of the storage unit 110, the input unit 120, the adjustment unit 150, and the management unit 160 can be implemented by a single processing circuit 109 or can be implemented by a plurality of processing circuits 109 in a distributed manner.

As another modification example, the function concerning control of the wireless information distribution apparatus 100 can be implemented by a combination of software and hardware. In other words, a part of the function concerning control of the wireless information distribution apparatus 100 can be implemented by dedicated hardware, and the remaining part thereof can be implemented by software.

The processor 101, the storage device 102, and the processing circuit 109 are collectively referred to as "processing circuitry". Thus, whichever of the configurations illustrated in FIG. 1 and FIG. 7 the configuration of the wireless information distribution apparatus 100 is, the functions of the storage unit 110, the input unit 120, the adjustment unit 150, and the management unit 160 are implemented by the processing circuitry.

Embodiment 2

A configuration of an apparatus according to the present embodiment, an operation of the apparatus according to the present embodiment, and an advantageous effect of the present embodiment are described in sequence. Differences thereof from the embodiment 1 are mainly described.

*Description of Configuration*

A configuration of a wireless information distribution apparatus 100 serving as an apparatus according to the present embodiment is described with reference to FIG. 8.

As in the embodiment 1, the wireless information distribution apparatus 100 acquires second data 320 serving as an index of the possibility that another apparatus 900 which distributes information by radio waves 910 is present around. Unlike the embodiment 1, in the present embodiment, the second data 320 includes, as data serving as such an index, number-of-apparatuses data 322 indicating the number of apparatuses each serving as another apparatus 900 identified by the wireless information distribution apparatus 100. In the present embodiment, if the number of apparatuses serving as transmission sources of radio waves 910 received by the wireless information distribution apparatus 100 is large, the possibility that another apparatus 900 is present around the wireless information distribution apparatus 100 is deemed to be high.

Figure 8:
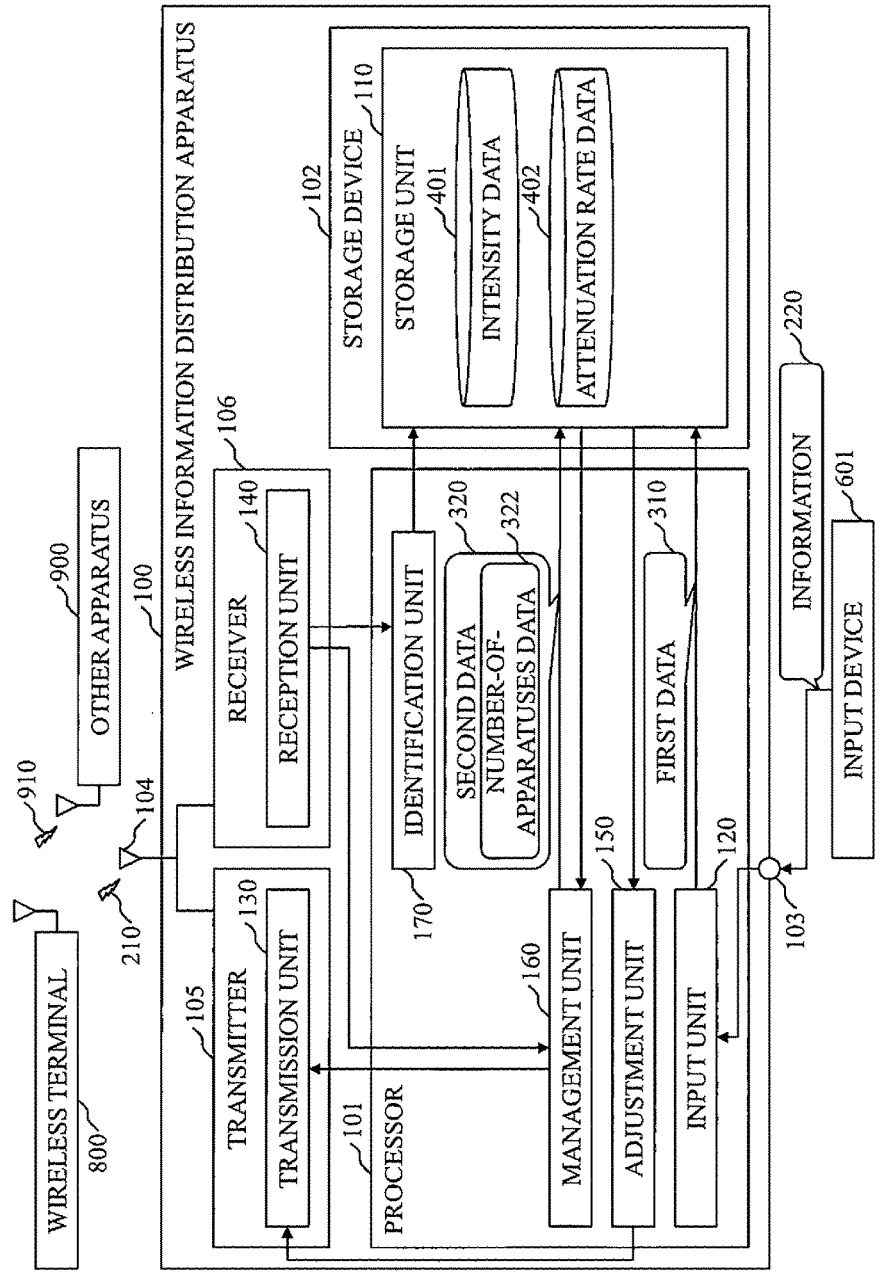
FIG. 8 is a block diagram illustrating a configuration of a wireless information distribution apparatus according to an embodiment 2.

As illustrated in FIG. 8, the wireless information distribution apparatus 100 includes an identification unit 170 in addition to the storage unit 110, the input unit 120, the transmission unit 130, the reception unit 140, the adjustment unit 150, and the management unit 160.

In the present embodiment, the wireless information distribution apparatus 100 is a computer. The function concerning control of the wireless information distribution apparatus 100 is implemented by software as in the embodiment 1. In the present embodiment, at least the functions of the input unit 120, the adjustment unit 150, the management unit 160, and the identification unit 170 are equivalent to the function concerning control of the wireless information distribution apparatus 100.

Information, data, signal values, and variable values indicating results of processing performed by the input unit 120, the adjustment unit 150, the management unit 160, and the identification unit 170 are stored in the auxiliary storage device, the memory, or a register or a cache memory included in the processor 101.

*Description of Operation*

An operation of the wireless information distribution apparatus 100, which is an apparatus according to the present embodiment, is described with reference to FIG. 4 and FIG. 9.

In the present embodiment, the operation of second data management, which is started in step S13 illustrated in FIG. 4, is different from that in the embodiment 1. Moreover, step S17 and step S18 illustrated in FIG. 4 are different from those in the embodiment 1.

Figure 9:
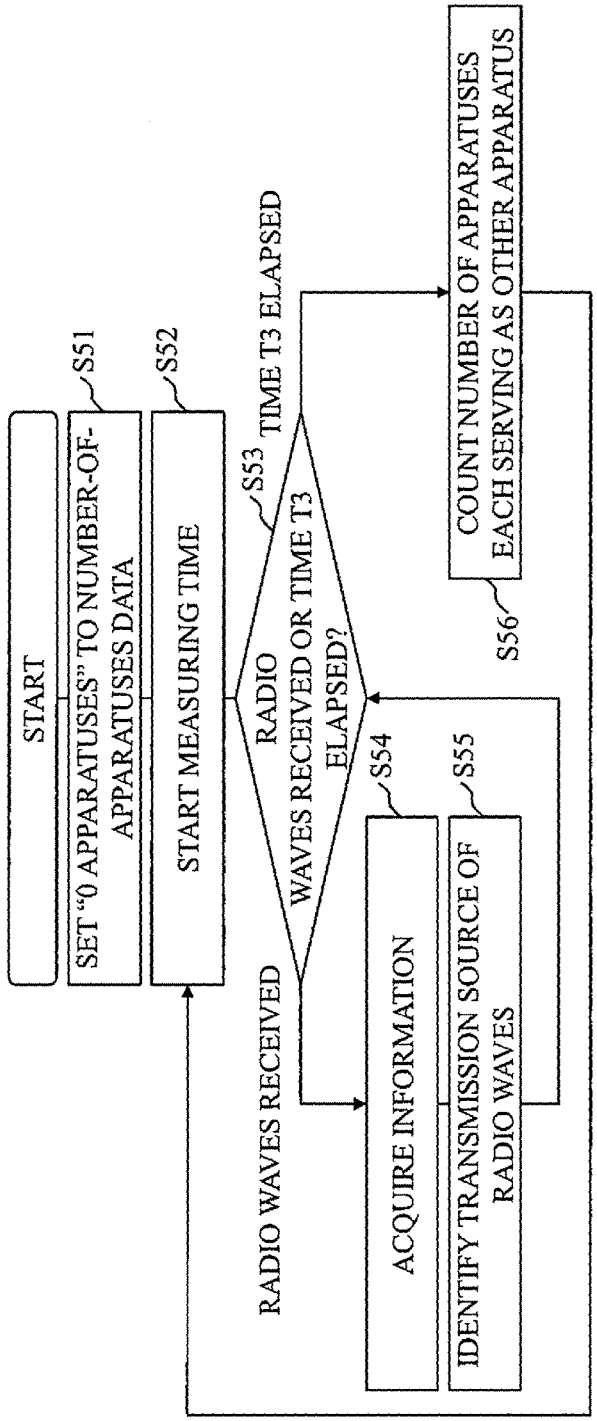
FIG. 9 is a flowchart illustrating an operation of second data management of the wireless information distribution apparatus according to the embodiment 2.

An operation illustrated in FIG. 9 is the operation of second data management in the present embodiment.

In step S51 illustrated in FIG. 9, the management unit 160 writes, in the storage unit 110, second data 320 including number-of-apparatuses data 322 indicating "0 apparatuses" as a default value. The number-of-apparatuses data 322 is data indicating the number of apparatuses each serving as another apparatus 900 identified by the identification unit 170.

In step S52 illustrated in FIG. 9, the management unit 160 starts measuring time using a timer function provided by the OS.

In step S53 illustrated in FIG. 9, the management unit 160 waits until the reception unit 140 receives radio waves 910 transmitted from another apparatus 900 or until the time measured since step S52 reaches a previously-set time T3. The time T3 can be any time, but is desirably a fixed time such as several seconds, several tens of seconds, several minutes, several tens of minutes, or several hours. In a case where the reception unit 140 has received radio waves 910 transmitted from another apparatus 900, the flow then proceeds to step S54. In a case where the time T3 has elapsed regardless of whether radio waves 910 transmitted from any number of apparatuses each serving as another apparatus 900 have been received by the reception unit 140, the management unit 160 resets the time measured since step S52, and the flow then proceeds to step S56.

In step S54 illustrated in FIG. 9, the reception unit 140 demodulates the received radio waves 910 to generate an analog signal. The reception unit 140 converts the generated analog signal into a digital signal. The reception unit 140 decodes the digital signal to acquire information included in the digital signal. This information is information distributed from another apparatus 900 which is a transmission source of radio waves 910 received by the reception unit 140.

In step S55 illustrated in FIG. 9, the identification unit 170 identifies, based on radio waves 910 received by the reception unit 140, a transmission source of the received radio waves 910. Specifically, the identification unit 170 extracts an identifier used to uniquely identify another apparatus 900, included in the information acquired in step S54. The identification unit 170 writes the extracted identifier in the storage unit 110. After that, the flow returns to step S53. Furthermore, the identification unit 170 can identify the transmission source of radio waves 910 by referring to a transmission source address of communication data included in the digital signal serving as an acquisition source of information in step S54. Alternatively, if a frequency band is individually allocated to another apparatus 900, the identification unit 170 can identify the transmission source of radio waves 910 based on frequencies of the radio waves 910. The reception unit 140 can omit processing such as demodulation and decoding in step S54 in the range in which the identification unit 170 is able to identify the transmission source of radio waves 910.

In step S56 illustrated in FIG. 9, the management unit 160 counts the number of apparatuses each serving as another apparatus 900 identified by the identification unit 170. Specifically, the management unit 160 reads, from the storage unit 110, identifiers extracted in step S55, after starting measurement of time in step S52. The management unit 160 counts the number of read different identifiers. Then, the management unit 160 updates the number-of-apparatuses data 322 stored in the storage unit 110 to number-of-apparatuses data 322 indicating the counted number. After that, the flow returns to step S52.

The operation of second data management continues until an instruction for ending is input to the input unit 120.

In step S17 illustrated in FIG. 4, the adjustment unit 150 acquires second data 320. Specifically, the adjustment unit 150 reads, from the storage unit 110, second data 320 including the number-of-apparatuses data 322 stored or updated by the operation of second data management.

In step S18 illustrated in FIG. 4, in a case where the number of apparatuses indicated by the number-of-apparatuses data 322 is greater than a previously-set threshold value N1, the adjustment unit 150 determines that there is a high possibility that another apparatus 900 is present around the wireless information distribution apparatus 100. In the present embodiment, in a case where the number of apparatuses indicated by the number-of-apparatuses data 322 is equal to the threshold value N1, the adjustment unit 150 also determines that there is a high possibility that another apparatus 900 is present around the wireless information distribution apparatus 100. After that, the flow proceeds to step S19. On the other hand, in a case where the number of apparatuses indicated by the number-of-apparatuses data 322 is less than the threshold value N1, the adjustment unit 150 determines that there is a low possibility that another apparatus 900 is present around the wireless information distribution apparatus 100. After that, the flow proceeds to step S20. Specifically, the adjustment unit 150 makes a comparison between the number of apparatuses indicated by the number-of-apparatuses data 322 and the threshold value N1, and outputs a result of the comparison as a Boolean value. Assuming that a Boolean value indicating that the number of apparatuses is equal to or greater than the threshold value N1 is "true", if "true" has been output, this means that the adjustment unit 150 has determined that there is a high possibility that another apparatus 900 is present around the wireless information distribution apparatus 100. On the other hand, if "false" has been output, this means that the adjustment unit 150 has determined that there is a low possibility that another apparatus 900 is present around the wireless information distribution apparatus 100.

In the present embodiment, whether the possibility that another apparatus 900 is present around the wireless information distribution apparatus 100 is high or low is determined according to whether the number of apparatuses indicated by the number-of-apparatuses data 322 is equal to or greater than the threshold value N1. In other words, in the present embodiment, the number of apparatuses indicated by the number-of-apparatuses data 322 is treated as an index of the possibility that another apparatus 900 is present around the wireless information distribution apparatus 100. The second data 320 which is acquired in step S17 is data including the number-of-apparatuses data 322 serving as such an index. Therefore, in the present embodiment, the number-of-apparatuses data 322 indicating the number of apparatuses each serving as another apparatus 900 identified by the identification unit 170 is equivalent to data serving as an index of the possibility that another apparatus 900 is present around the wireless information distribution apparatus 100.

As described above, in the present embodiment, the adjustment unit 150 makes the intensity of radio waves 210 which are transmitted from the transmission unit 130 lower in a case where the number of apparatuses indicated by the number-of-apparatuses data 322 is greater than the threshold value N1 than in a case where the number of apparatuses indicated by the number-of-apparatuses data 322 is less than the threshold value N1. Therefore, as in the embodiment 1, when another apparatus 900 is present near the wireless information distribution apparatus 100, the transmitted radio wave intensity of the wireless information distribution apparatus 100 can be kept low.

The threshold value N1 can be set to any integer value. If the threshold value N1 is set to zero, as in the embodiment 1, the transmitted radio wave intensity of the wireless information distribution apparatus 100 is always weakened when there are radio waves 910 transmitted from another apparatus 900. On the other hand, if the threshold value N1 is set to a somewhat large value, the transmitted radio wave intensity of the wireless information distribution apparatus 100 is weakened only when there are radio waves 910 transmitted from a great number of apparatuses each serving as another apparatus 900. Furthermore, the input unit 120 can be configured to be able to receive setting or changing of the threshold value N1 by the user at any given point in time.

In the present embodiment, the first data 310 is data indicating the number of persons present around the wireless information distribution apparatus 100, but can be replaced with data indicating the density of persons present around the wireless information distribution apparatus 100. This is the same as in the embodiment 1.

*Description of Advantageous Effects of Embodiment*

In the present embodiment, the transmitted radio wave intensity of the wireless information distribution apparatus 100 is adjusted based on not only the number of persons present around the wireless information distribution apparatus 100 but also the number of apparatuses each serving as another apparatus 900 identified by the wireless information distribution apparatus 100. Therefore, according to the present embodiment, information distribution performed by the wireless information distribution apparatus 100 is made unlikely to hinder information distribution performed by another apparatus 900.

*Other Configurations*

While, in the present embodiment, the function concerning control of the wireless information distribution apparatus 100 is implemented by software as in the embodiment 1, the function concerning control of the wireless information distribution apparatus 100 can be implemented by hardware as in the modification example of the embodiment 1. Alternatively, the function concerning control of the wireless information distribution apparatus 100 can be implemented by a combination of software and hardware.

Embodiment 3

A configuration of an apparatus according to the present embodiment, an operation of the apparatus according to the present embodiment, and an advantageous effect of the present embodiment are described in sequence. Differences thereof from the embodiment 1 are mainly described.

*Description of Configuration*

A configuration of a wireless information distribution apparatus 100 serving as an apparatus according to the present embodiment is described with reference to FIG. 10.

In the present embodiment, the wireless information distribution apparatus 100 is installed in a movable body, such as a train or an automobile, or, in particular, a movable body of public transportation as mentioned above.

As in the embodiment 1, the wireless information distribution apparatus 100 acquires second data 320 serving as an index of the possibility that another apparatus 900 which distributes information by radio waves 910 is present around. Unlike the embodiment 1, in the present embodiment, the second data 320 includes, as data serving as such an index, speed data 323 indicating the speed of movement of the wireless information distribution apparatus 100 detected by the wireless information distribution apparatus 100. In the present embodiment, if the speed detected by the wireless information distribution apparatus 100 is low, the possibility that another apparatus 900 is present around the wireless information distribution apparatus 100 is deemed to be high. This is based on such an idea that, the lower the speed, the higher the probability that another movable body in which another apparatus 900 is installed is present near the movable body in which the wireless information distribution apparatus 100 is installed is.

Figure 10:
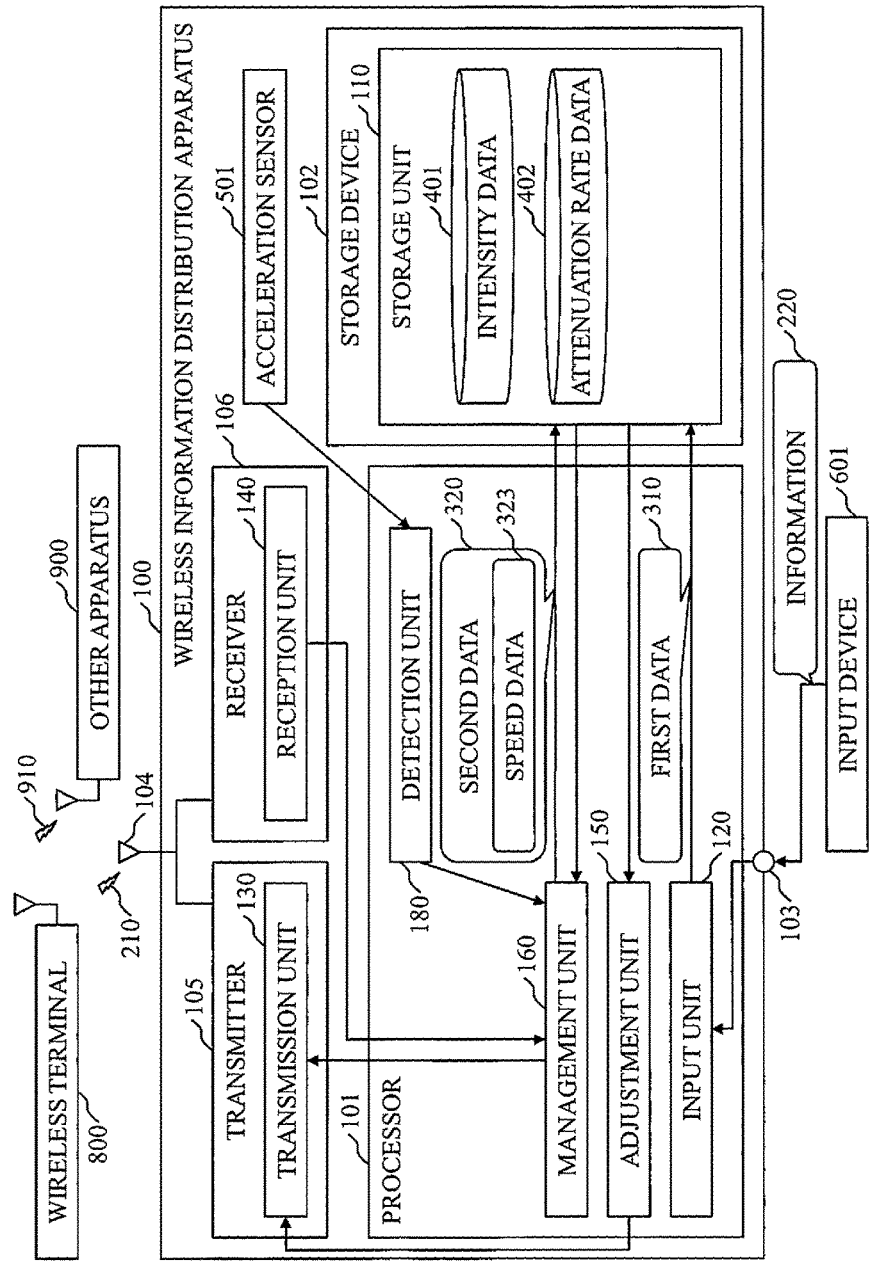
FIG. 10 is a block diagram illustrating a configuration of a wireless information distribution apparatus according to an embodiment 3.

As illustrated in FIG. 10, the wireless information distribution apparatus 100 includes a detection unit 180 in addition to the storage unit 110, the input unit 120, the transmission unit 130, the reception unit 140, the adjustment unit 150, and the management unit 160.

In the present embodiment, the wireless information distribution apparatus 100 is a computer. The function concerning control of the wireless information distribution apparatus 100 is implemented by software as in the embodiment 1. In the present embodiment, at least the functions of the input unit 120, the adjustment unit 150, the management unit 160, and the detection unit 180 are equivalent to the function concerning control of the wireless information distribution apparatus 100.

The wireless information distribution apparatus 100 includes an acceleration sensor 501 as hardware. The acceleration sensor 501 detects the acceleration of the wireless information distribution apparatus 100.

Information, data, signal values, and variable values indicating results of processing performed by the input unit 120, the adjustment unit 150, the management unit 160, and the detection unit 180 are stored in the auxiliary storage device, the memory, or a register or a cache memory included in the processor 101.

*Description of Operation*

An operation of the wireless information distribution apparatus 100, which is an apparatus according to the present embodiment, is described with reference to FIG. 4 and FIG. 11.

In the present embodiment, the operation of second data management, which is started in step S13 illustrated in FIG. 4, is different from that in the embodiment 1. Moreover, step S17 and step S18 illustrated in FIG. 4 are different from those in the embodiment 1.

Figure 11:
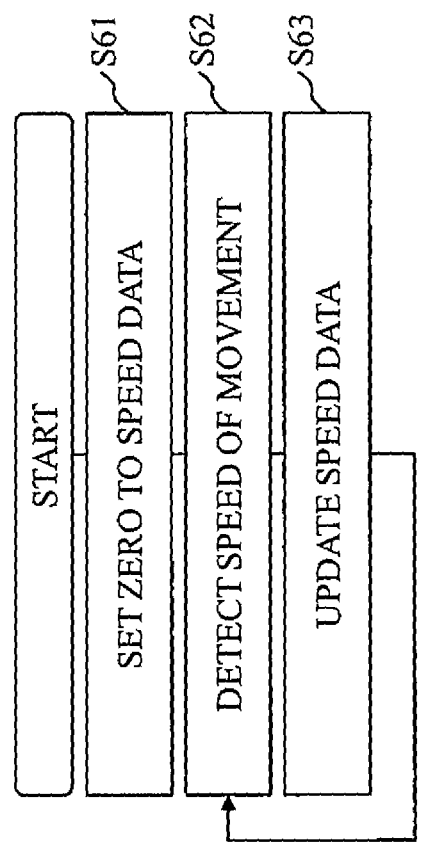
FIG. 11 is a flowchart illustrating an operation of second data management of the wireless information distribution apparatus according to the embodiment 3.

An operation illustrated in FIG. 11 is the operation of second data management in the present embodiment.

In step S61 illustrated in FIG. 11, the management unit 160 writes, in the storage unit 110, second data 320 including speed data 323 indicating zero as a default value. The speed data 323 is data indicating the speed detected by the detection unit 180.

In step S62 illustrated in FIG. 11, the detection unit 180 detects the speed of movement of the wireless information distribution apparatus 100 based on a change in acceleration detected by the acceleration sensor 501. Specifically, the detection unit 180 calculates the speed of movement of the wireless information distribution apparatus 100 by integrating the acceleration detected by the acceleration sensor 501 with a time T4. The time T4 is a time for which to observe a change in acceleration to calculate the speed. The time T4 can be any time, but, in the present embodiment, is a fixed time such as several seconds, several tens of seconds, and several minutes. Furthermore, the detection unit 180 can detect the speed of movement of the wireless information distribution apparatus 100 using a means different from the acceleration sensor 501. As a specific example, the detection unit 180 can detect the speed of movement of the wireless information distribution apparatus 100 based on a change in position detected with use of a global positioning system (GPS). Alternatively, the detection unit 180 can receive, via the input interface 103, inputting of a signal indicating the velocity of the movable body, in which the wireless information distribution apparatus 100 is installed, from a speed meter of the movable body and calculate the speed of movement of the wireless information distribution apparatus 100 based on the velocity indicated by the signal.

In step S63 illustrated in FIG. 11, the management unit 160 updates the speed data 323 stored in the storage unit 110 to speed data 323 indicating the speed detected in step S62. After that, the flow returns to step S62.

The operation of second data management continues until an instruction for ending is input to the input unit 120.

In step S17 illustrated in FIG. 4, the adjustment unit 150 acquires second data 320. Specifically, the adjustment unit 150 reads, from the storage unit 110, second data 320 including the speed data 323 stored or updated by the operation of second data management.

In step S18 illustrated in FIG. 4, in a case where the speed indicated by the speed data 323 is lower than a previously-set threshold value N2, the adjustment unit 150 determines that there is a high possibility that another apparatus 900 is present around the wireless information distribution apparatus 100. In the present embodiment, in a case where the speed indicated by the speed data 323 is equal to the threshold value N2, the adjustment unit 150 also determines that there is a high possibility that another apparatus 900 is present around the wireless information distribution apparatus 100. After that, the flow proceeds to step S19. On the other hand, in a case where the speed indicated by the speed data 323 is higher than the threshold value N2, the adjustment unit 150 determines that there is a low possibility that another apparatus 900 is present around the wireless information distribution apparatus 100. After that, the flow proceeds to step S20. Specifically, the adjustment unit 150 makes a comparison between the speed indicated by the speed data 323 and the threshold value N2, and outputs a result of the comparison as a Boolean value. Assuming that a Boolean value indicating that the speed is equal to or lower than the threshold value N2 is "true", if "true" has been output, this means that the adjustment unit 150 has determined that there is a high possibility that another apparatus 900 is present around the wireless information distribution apparatus 100. On the other hand, if "false" has been output, this means that the adjustment unit 150 has determined that there is a low possibility that another apparatus 900 is present around the wireless information distribution apparatus 100.

In the present embodiment, whether the possibility that another apparatus 900 is present around the wireless information distribution apparatus 100 is high or low is determined according to whether the speed indicated by the speed data 323 is equal to or lower than the threshold value N2. In other words, in the present embodiment, the speed indicated by the speed data 323 is treated as an index of the possibility that another apparatus 900 is present around the wireless information distribution apparatus 100. The second data 320 which is acquired in step S17 is data including the speed data 323 serving as such an index. Therefore, in the present embodiment, the speed data 323 indicating the speed detected by the detection unit 180 is equivalent to data serving as an index of the possibility that another apparatus 900 is present around the wireless information distribution apparatus 100.

As described above, in the present embodiment, the adjustment unit 150 makes the intensity of radio waves 210 which are transmitted from the transmission unit 130 lower in a case where the speed indicated by the speed data 323 is lower than the threshold value N2 than in a case where the speed indicated by the speed data 323 is higher than the threshold value N2. Therefore, as in the embodiment 1, when another apparatus 900 is present near the wireless information distribution apparatus 100, the transmitted radio wave intensity of the wireless information distribution apparatus 100 can be kept low.

The threshold value N2 can be set to any integer value or real value. In particular, if the threshold value N2 is set to zero, the adjustment unit 150 makes the intensity of radio waves 210 transmitted from the transmission unit 130 lower in a case where the speed indicated by the speed data 323 is zero than in a case where the speed indicated by the speed data 323 is not zero. In other words, the transmitted radio wave intensity of the wireless information distribution apparatus 100 is weakened only when the wireless information distribution apparatus 100 is at a stop.

In the present embodiment, the first data 310 is data indicating the number of persons present around the wireless information distribution apparatus 100, but can be replaced with data indicating the density of persons present around the wireless information distribution apparatus 100. This is the same as in the embodiment 1.

*Description of Advantageous Effects of Embodiment*

In the present embodiment, the transmitted radio wave intensity of the wireless information distribution apparatus 100 is adjusted based on not only the number of persons present around the wireless information distribution apparatus 100 but also the speed of movement of the wireless information distribution apparatus 100 detected by the wireless information distribution apparatus 100. Therefore, according to the present embodiment, information distribution performed by the wireless information distribution apparatus 100 is made unlikely to hinder information distribution performed by another apparatus 900.

*Other Configurations*

While, in the present embodiment, the function concerning control of the wireless information distribution apparatus 100 is implemented by software as in the embodiment 1, the function concerning control of the wireless information distribution apparatus 100 can be implemented by hardware as in the modification example of the embodiment 1. Alternatively, the function concerning control of the wireless information distribution apparatus 100 can be implemented by a combination of software and hardware.

Embodiment 4

A configuration of an apparatus according to the present embodiment, an operation of the apparatus according to the present embodiment, and an advantageous effect of the present embodiment are described in sequence. Differences thereof from the embodiment 1 are mainly described.

*Description of Configuration*

A configuration of a wireless information distribution apparatus 100 serving as an apparatus according to the present embodiment is described with reference to FIG. 12.

In the present embodiment, the wireless information distribution apparatus 100 is installed in a movable body, such as a train or an automobile, or, in particular, a movable body of public transportation as mentioned above.

As in the embodiment 1, the wireless information distribution apparatus 100 acquires second data 320 serving as an index of the possibility that another apparatus 900 which distributes information by radio waves 910 is present around. Unlike the embodiment 1, in the present embodiment, the second data 320 includes, as data serving as such an index, location data 324 indicating the location of the wireless information distribution apparatus 100 detected by the wireless information distribution apparatus 100. In the present embodiment, if the location detected by the wireless information distribution apparatus 100 is within a geographical range in which another apparatus 900 is present, the possibility that another apparatus 900 is present around the wireless information distribution apparatus 100 is deemed to be high.

Figure 12:
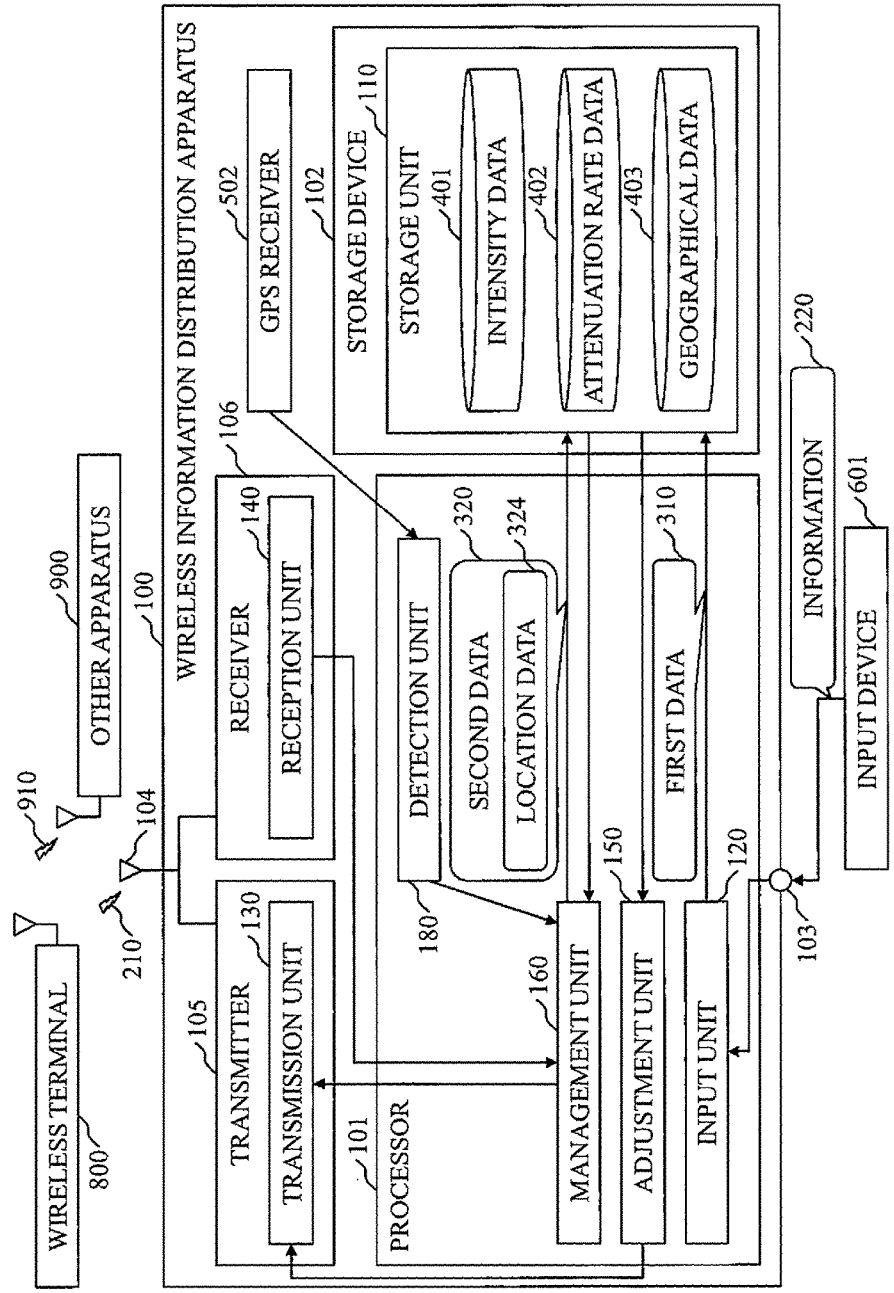
FIG. 12 is a block diagram illustrating a configuration of a wireless information distribution apparatus according to an embodiment 4.

As illustrated in FIG. 12, the wireless information distribution apparatus 100 includes a detection unit 180 in addition to the storage unit 110, the input unit 120, the transmission unit 130, the reception unit 140, the adjustment unit 150, and the management unit 160.

The storage unit 110 stores geographical data 403 in addition to the intensity data 401 and the attenuation rate data 402.

The geographical data 403 is data indicating a geographical range in which another apparatus 900 is present. Specifically, the geographical data 403 is data indicating latitudes and longitudes of two diagonal points of a rectangular geographical range in which another apparatus 900 is installed or is likely to be installed. Furthermore, the geographical data 403 can be data indicating latitudes and longitudes of four corners of a rectangular geographical range. Alternatively, the geographical data 403 can be data indicating a geographical range with a shape other than a rectangle. In the present embodiment, the geographical data 403 is manually created and is previously stored in the storage unit 110. When another apparatus 900 is newly installed, is relocated, or is removed, the geographical data 403 stored in the storage unit 110 is manually updated.

In the present embodiment, the wireless information distribution apparatus 100 is a computer. The function concerning control of the wireless information distribution apparatus 100 is implemented by software as in the embodiment 1. In the present embodiment, at least the functions of the input unit 120, the adjustment unit 150, the management unit 160, and the detection unit 180 are equivalent to the function concerning control of the wireless information distribution apparatus 100.

The wireless information distribution apparatus 100 includes a GPS receiver 502 as hardware. The GPS receiver 502 receives a positioning signal from a GPS satellite, and calculates the actual location based on the positioning signal.

Information, data, signal values, and variable values indicating results of processing performed by the input unit 120, the adjustment unit 150, the management unit 160, and the detection unit 180 are stored in the auxiliary storage device, the memory, or a register or a cache memory included in the processor 101.

*Description of Operation*

An operation of the wireless information distribution apparatus 100, which is an apparatus according to the present embodiment, is described with reference to FIG. 4 and FIG. 13.

In the present embodiment, the operation of second data management, which is started in step S13 illustrated in FIG. 4, is different from that in the embodiment 1. Moreover, step S17 and step S18 illustrated in FIG. 4 are different from those in the embodiment 1.

Figure 13:
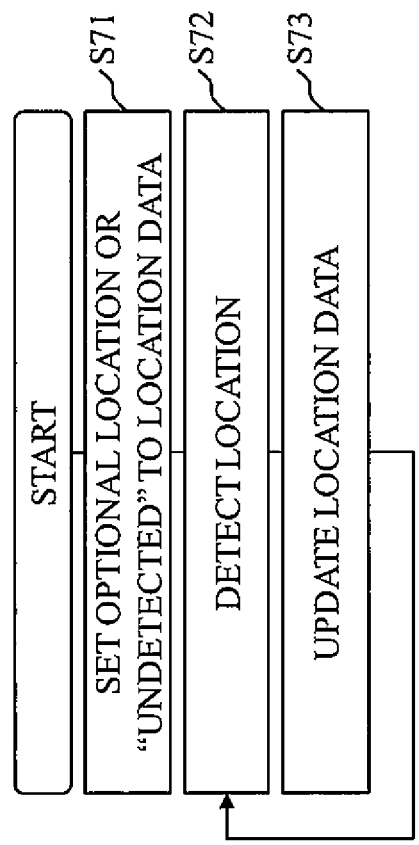
FIG. 13 is a flowchart illustrating an operation of second data management of the wireless information distribution apparatus according to the embodiment 4.

An operation illustrated in FIG. 13 is the operation of second data management in the present embodiment.

In step S71 illustrated in FIG. 13, the management unit 160 writes, in the storage unit 110, second data 320 including location data 324 indicating an optional location as a default value or indicating that no location is yet detected, in other words, indicating "undetected". The location data 324 is data indicating a location detected by the detection unit 180.

In step S72 illustrated in FIG. 13, the detection unit 180 detects the location of the wireless information distribution apparatus 100 by causing the GPS receiver 502 to calculate the actual location. Specifically, the detection unit 180 acquires numerical values of latitudes and longitudes of the actual location calculated by the GPS receiver 502.

In step S73 illustrated in FIG. 13, the management unit 160 updates the location data 324 stored in the storage unit 110 to location data 324 indicating the location detected in step S72. After that, the flow returns to step S72.

The operation of second data management continues until an instruction for ending is input to the input unit 120.

In step S17 illustrated in FIG. 4, the adjustment unit 150 acquires second data 320. Specifically, the adjustment unit 150 reads, from the storage unit 110, second data 320 including the location data 324 stored or updated by the operation of second data management.

In step S18 illustrated in FIG. 4, in a case where the location indicated by the location data 324 is within a geographical range indicated by the geographical data 403 stored in the storage unit 110, the adjustment unit 150 determines that there is a high possibility that another apparatus 900 is present around the wireless information distribution apparatus 100. After that, the flow proceeds to step S19. On the other hand, in a case where the location indicated by the location data 324 is outside the geographical range indicated by the geographical data 403 stored in the storage unit 110, the adjustment unit 150 determines that there is a low possibility that another apparatus 900 is present around the wireless information distribution apparatus 100. After that, the flow proceeds to step S20. Specifically, the adjustment unit 150 makes a comparison between the latitude and longitude of the location indicated by the location data 324 and the latitudes and longitudes of two diagonal points of the geographical range indicated by the geographical data 403, and outputs a result of the comparison as a Boolean value. Assuming that a Boolean value indicating that the location is within the geographical range is "true", if "true" has been output, this means that the adjustment unit 150 has determined that there is a high possibility that another apparatus 900 is present around the wireless information distribution apparatus 100. On the other hand, if "false" has been output, this means that that the adjustment unit 150 has determined that there is a low possibility that another apparatus 900 is present around the wireless information distribution apparatus 100.

In the present embodiment, whether the possibility that another apparatus 900 is present around the wireless information distribution apparatus 100 is high or low is determined according to whether the location indicated by the location data 324 is within a geographical range indicated by the geographical data 403. In other words, in the present embodiment, the location indicated by the location data 324 is treated as an index of the possibility that another apparatus 900 is present around the wireless information distribution apparatus 100. The second data 320 which is acquired in step S17 is data including the location data 324 serving as such an index. Therefore, in the present embodiment, the location data 324 indicating the location detected by the detection unit 180 is equivalent to data serving as an index of the possibility that another apparatus 900 is present around the wireless information distribution apparatus 100.

As described above, in the present embodiment, the adjustment unit 150 makes the intensity of radio waves 210 which are transmitted from the transmission unit 130 lower in a case where the location indicated by the location data 324 is within the geographical range indicated by the geographical data 403 stored in the storage unit 110 than in a case where the location is outside the geographical range. Therefore, as in the embodiment 1, when another apparatus 900 is present near the wireless information distribution apparatus 100, the transmitted radio wave intensity of the wireless information distribution apparatus 100 can be kept low.

The geographical data 403 can be data indicating a range in which another apparatus 900 is installed or is likely to be installed with a distance from the end of a road or a railway track. In that case, in step S72, the detection unit 180 acquires a traveling record of the movable body in which the wireless information distribution apparatus 100 is installed, and detects the location of the wireless information distribution apparatus 100 from the acquired traveling record. Specifically, the detection unit 180 calculates the travel distance of the wireless information distribution apparatus 100 from the end of a road or a railway track. In step S18, the adjustment unit 150 compares the travel distance indicated by the location data 324 and the distance indicated by the geographical data 403 with each other. The other operations are the same as those performed in a case where the geographical data 403 is data indicating latitudes and longitudes.

In the present embodiment, the first data 310 is data indicating the number of persons present around the wireless information distribution apparatus 100, but can be replaced with data indicating the density of persons present around the wireless information distribution apparatus 100. This is the same as in the embodiment 1.

*Description of Advantageous Effects of Embodiment*

In the present embodiment, the transmitted radio wave intensity of the wireless information distribution apparatus 100 is adjusted based on not only the number of persons present around the wireless information distribution apparatus 100 but also the location of the wireless information distribution apparatus 100 detected by the wireless information distribution apparatus 100. Therefore, according to the present embodiment, information distribution performed by the wireless information distribution apparatus 100 is made unlikely to hinder information distribution performed by another apparatus 900.

\*\*\*Other Configurations\*\*\*

While, in the present embodiment, the function concerning control of the wireless information distribution apparatus 100 is implemented by software as in the embodiment 1, the function concerning control of the wireless information distribution apparatus 100 can be implemented by hardware as in the modification example of the embodiment 1. Alternatively, the function concerning control of the wireless information distribution apparatus 100 can be implemented by a combination of software and hardware.

Embodiment 5

A configuration of an apparatus according to the present embodiment, an operation of the apparatus according to the present embodiment, and an advantageous effect of the present embodiment are described in sequence. Differences thereof from the embodiment 1 are mainly described.

\*\*\*Description of Configuration\*\*\*

A configuration of a wireless information distribution apparatus 100 serving as an apparatus according to the present embodiment is described with reference to FIG. 14.

In the present embodiment, the wireless information distribution apparatus 100 is installed in a space separated by a structural object which does not allow radio waves to pass therethrough or which greatly attenuates radio waves. This structural object is provided with a partition for closing the space in which the wireless information distribution apparatus 100 is installed. The partition can be any object as long as it allows opening and closing, but, in the present embodiment, is a door. The partition has a structure which does not allow radio waves to pass therethrough or which greatly attenuates radio waves, as with the structural object.

As in the embodiment 1, the wireless information distribution apparatus 100 acquires second data 320 serving as an index of the possibility that another apparatus 900 which distributes information by radio waves 910 is present around. Unlike the embodiment 1, in the present embodiment, the second data 320 includes, as data serving as such an index, state data 325 indicating the opening or closing state of the partition detected by the wireless information distribution apparatus 100. In the present embodiment, if the opening or closing state detected by the wireless information distribution apparatus 100 is the opening state, the possibility that another apparatus 900 is present around the wireless information distribution apparatus 100 is deemed to be high. This is based on such an idea that, when the partition is closed, even if another apparatus 900 is present outside the space closed by the partition, radio waves 910 transmitted from another apparatus 900 do not reach the inside of the space and, therefore, the wireless information distribution apparatus 100 is placed under the same condition as in a case where another apparatus 900 is not present around.

Figure 14:
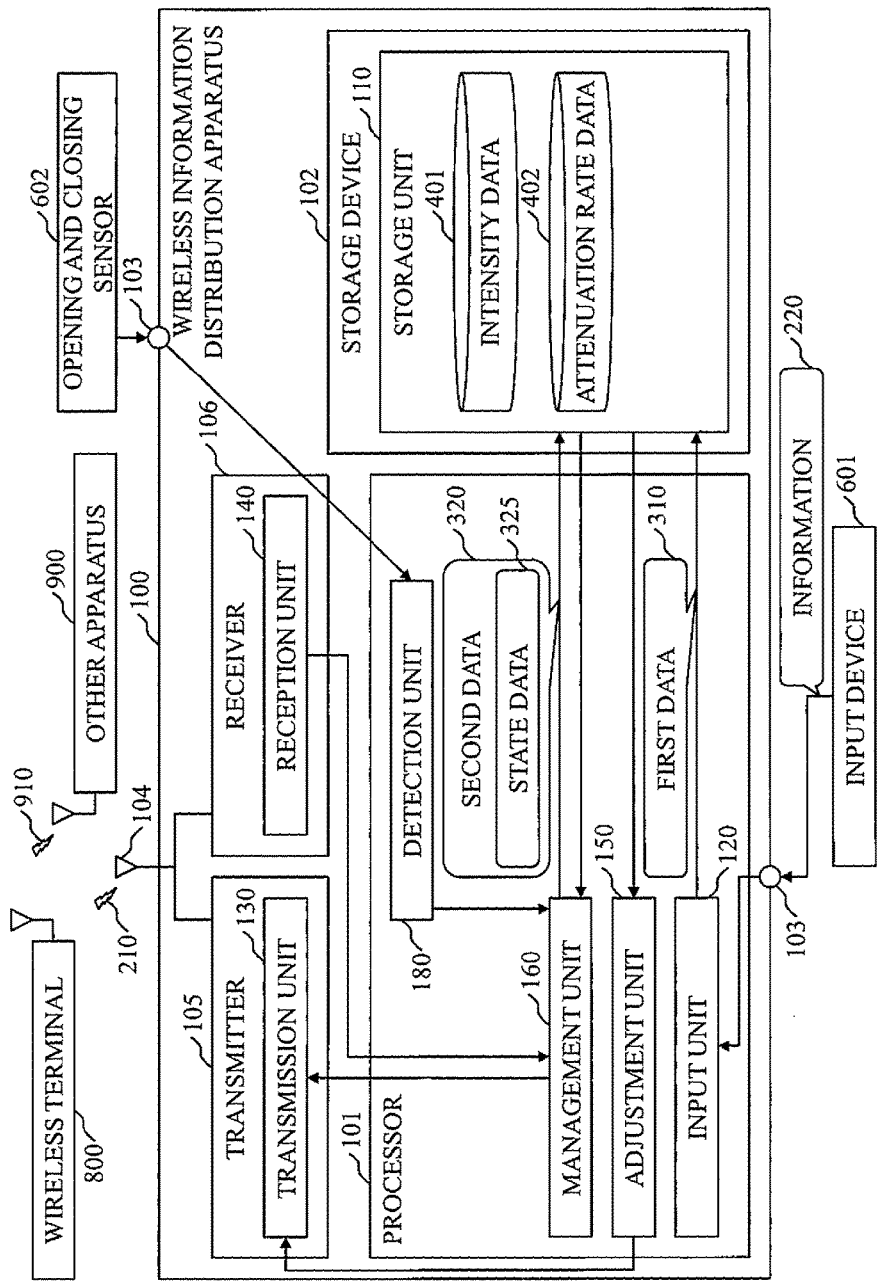
FIG. 14 is a block diagram illustrating a configuration of a wireless information distribution apparatus according to an embodiment 5.

As illustrated in FIG. 14, the wireless information distribution apparatus 100 includes a detection unit 180 in addition to the storage unit 110, the input unit 120, the transmission unit 130, the reception unit 140, the adjustment unit 150, and the management unit 160.

In the present embodiment, the wireless information distribution apparatus 100 is a computer. The function concerning control of the wireless information distribution apparatus 100 is implemented by software as in the embodiment 1. In the present embodiment, at least the functions of the input unit 120, the adjustment unit 150, the management unit 160, and the detection unit 180 are equivalent to the function concerning control of the wireless information distribution apparatus 100.

The wireless information distribution apparatus 100 includes, as the input interface 103, not only a port which is connected to the input device 601 but also a port which is connected to an opening and closing sensor 602. The opening and closing sensor 602, which is attached to the partition, detects the opening or closing state of the partition.

Information, data, signal values, and variable values indicating results of processing performed by the input unit 120, the adjustment unit 150, the management unit 160, and the detection unit 180 are stored in the auxiliary storage device, the memory, or a register or a cache memory included in the processor 101.

\*\*\*Description of Operation\*\*\*

An operation of the wireless information distribution apparatus 100, which is an apparatus according to the present embodiment, is described with reference to FIG. 4 and FIG. 15.

In the present embodiment, the operation of second data management, which is started in step S13 illustrated in FIG. 4, is different from that in the embodiment 1. Moreover, step S17 and step S18 illustrated in FIG. 4 are different from those in the embodiment 1.

Figure 15:
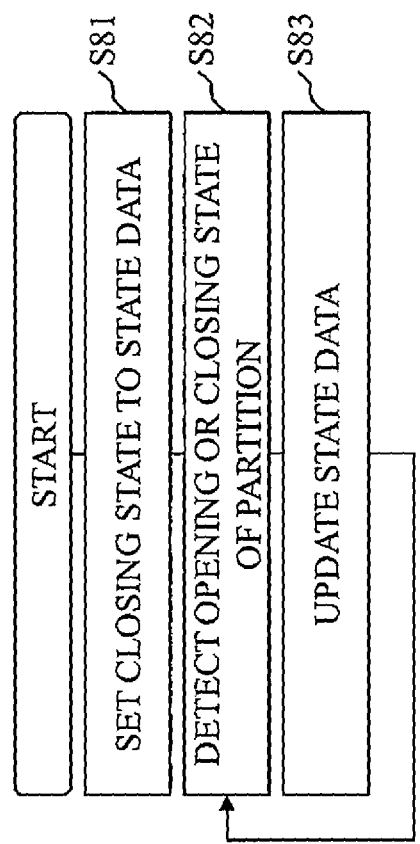
FIG. 15 is a flowchart illustrating an operation of second data management of the wireless information distribution apparatus according to the embodiment 5.

An operation illustrated in FIG. 15 is the operation of second data management in the present embodiment.

In step S81 illustrated in FIG. 15, the management unit 160 writes, in the storage unit 110, second data 320 including state data 325 indicating the closing state as a default value. The state data 325 is data indicating the opening or closing state detected by the detection unit 180. Furthermore, the management unit 160 can write, in the storage unit 110, second data 320 including state data 325 indicating the opening state as a default value or indicating that the opening or closing state is not yet detected.

In step S82 illustrated in FIG. 15, the detection unit 180 detects the opening or closing state of the partition using the opening and closing sensor 602. Specifically, when the partition is open, the opening and closing sensor 602 inputs, to the detection unit 180, a signal indicating that the partition is open as a signal indicating the opening or closing state of the partition. When the partition is closed, the opening and closing sensor 602 inputs, to the detection unit 180, a signal indicating that the partition is closed as a signal indicating the opening or closing state of the partition. The detection unit 180 receives inputting of the signal indicating the opening or closing state of the partition from the opening and closing sensor 602 via the input interface 103. Then, the detection unit 180 notifies the management unit 160 of the opening or closing state indicated by the input signal.

In step S83 illustrated in FIG. 15, in a case where the opening or closing state indicated by the state data 325 stored in the storage unit 110 and the opening or closing state detected in step S82 are different from each other, the management unit 160 updates the stored state data 325 to the state data 325 indicating the opening or closing state detected in step S82. After that, the flow returns to step S82.

The operation of second data management continues until an instruction for ending is input to the input unit 120.

In step S17 illustrated in FIG. 4, the adjustment unit 150 acquires second data 320. Specifically, the adjustment unit 150 reads, from the storage unit 110, second data 320 including the state data 325 stored or updated by the operation of second data management.

In step S18 illustrated in FIG. 4, in a case where the opening or closing state indicated by the state data 325 is the opening state, the adjustment unit 150 determines that there is a high possibility that another apparatus 900 is present around the wireless information distribution apparatus 100. After that, the flow proceeds to step S19. On the other hand, in a case where the opening or closing state indicated by the state data 325 is the closing state, the adjustment unit 150 determines that there is a low possibility that another apparatus 900 is present around the wireless information distribution apparatus 100. After that, the flow proceeds to step S20. Specifically, the adjustment unit 150 outputs the opening or closing state indicated by the state data 325 as a Boolean value. Assuming that a Boolean value indicating the opening state is "true", if "true" has been output, this means that the adjustment unit 150 has determined that there is a high possibility that another apparatus 900 is present around the wireless information distribution apparatus 100. On the other hand, if "false" has been output, this means that the adjustment unit 150 has determined that there is a low possibility that another apparatus 900 is present around the wireless information distribution apparatus 100.

In the present embodiment, whether the possibility that another apparatus 900 is present around the wireless information distribution apparatus 100 is high or low is determined according to the opening or closing state indicated by the state data 325. In other words, in the present embodiment, the opening or closing state indicated by the state data 325 is treated as an index of the possibility that another apparatus 900 is present around the wireless information distribution apparatus 100. The second data 320 which is acquired in step S17 is data including the state data 325 serving as such an index. Therefore, in the present embodiment, the state data 325 indicating the opening or closing state detected by the detection unit 180 is equivalent to data serving as an index of the possibility that another apparatus 900 is present around the wireless information distribution apparatus 100.

As described above, in the present embodiment, the adjustment unit 150 makes the intensity of radio waves 210 which are transmitted from the transmission unit 130 lower in a case where the opening or closing state indicated by the state data 325 is the opening state than in a case where the opening or closing state indicated by the state data 325 is the closing state. Therefore, when a space in which the wireless information distribution apparatus 100 is installed is made open and another apparatus 900 is present near the space, the transmitted radio wave intensity of the wireless information distribution apparatus 100 can be kept low.

In the present embodiment, the first data 310 is data indicating the number of persons present around the wireless information distribution apparatus 100, but can be replaced with data indicating the density of persons present around the wireless information distribution apparatus 100. This is the same as in the embodiment 1.

*Description of Advantageous Effects of Embodiment*

In the present embodiment, the transmitted radio wave intensity of the wireless information distribution apparatus 100 is adjusted based on not only the number of persons present around the wireless information distribution apparatus 100 but also the opening or closing state of the partition detected by the wireless information distribution apparatus 100. Therefore, according to the present embodiment, information distribution performed by the wireless information distribution apparatus 100 is made unlikely to hinder information distribution performed by another apparatus 900.

*Other Configurations*

While, in the present embodiment, the function concerning control of the wireless information distribution apparatus 100 is implemented by software as in the embodiment 1, the function concerning control of the wireless information distribution apparatus 100 can be implemented by hardware as in the modification example of the embodiment 1. Alternatively, the function concerning control of the wireless information distribution apparatus 100 can be implemented by a combination of software and hardware.

Embodiment 6

A configuration of an apparatus according to the present embodiment, an operation of the apparatus according to the present embodiment, and an advantageous effect of the present embodiment are described in sequence. Differences thereof from the embodiment 1 are mainly described.

*Description of Configuration*

A configuration of a wireless information distribution apparatus 100 serving as an apparatus according to the present embodiment is described with reference to FIG. 16.

Figure 16:
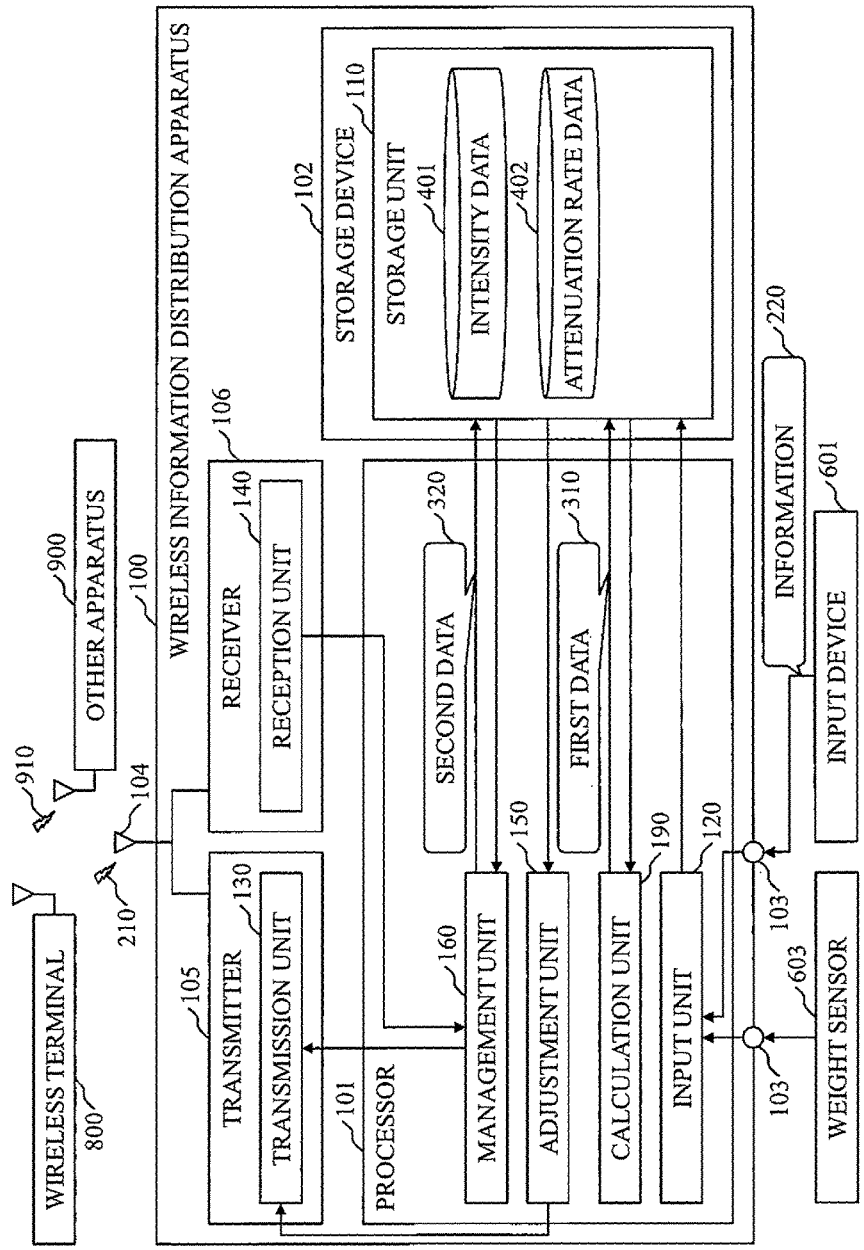
FIG. 16 is a block diagram illustrating a configuration of a wireless information distribution apparatus according to an embodiment 6.

As illustrated in FIG. 16, the wireless information distribution apparatus 100 includes a calculation unit 190 in addition to the storage unit 110, the input unit 120, the transmission unit 130, the reception unit 140, the adjustment unit 150, and the management unit 160.

In the present embodiment, the wireless information distribution apparatus 100 is a computer. The function concerning control of the wireless information distribution apparatus 100 is implemented by software as in the embodiment 1. In the present embodiment, at least the functions of the input unit 120, the adjustment unit 150, the management unit 160, and the calculation unit 190 are equivalent to the function concerning control of the wireless information distribution apparatus 100.

The wireless information distribution apparatus 100 includes, as the input interface 103, not only a port which is connected to the input device 601 but also a port which is connected to a weight sensor 603. The weight sensor 603 is located under the floor of a place in which the wireless information distribution apparatus 100 is installed.

Information, data, signal values, and variable values indicating results of processing performed by the input unit 120, the adjustment unit 150, the management unit 160, and the calculation unit 190 are stored in the auxiliary storage device, the memory, or a register or a cache memory included in the processor 101.

*Description of Operation*

An operation of the wireless information distribution apparatus 100, which is an apparatus according to the present embodiment, is described with reference to FIG. 17.

Figure 17:
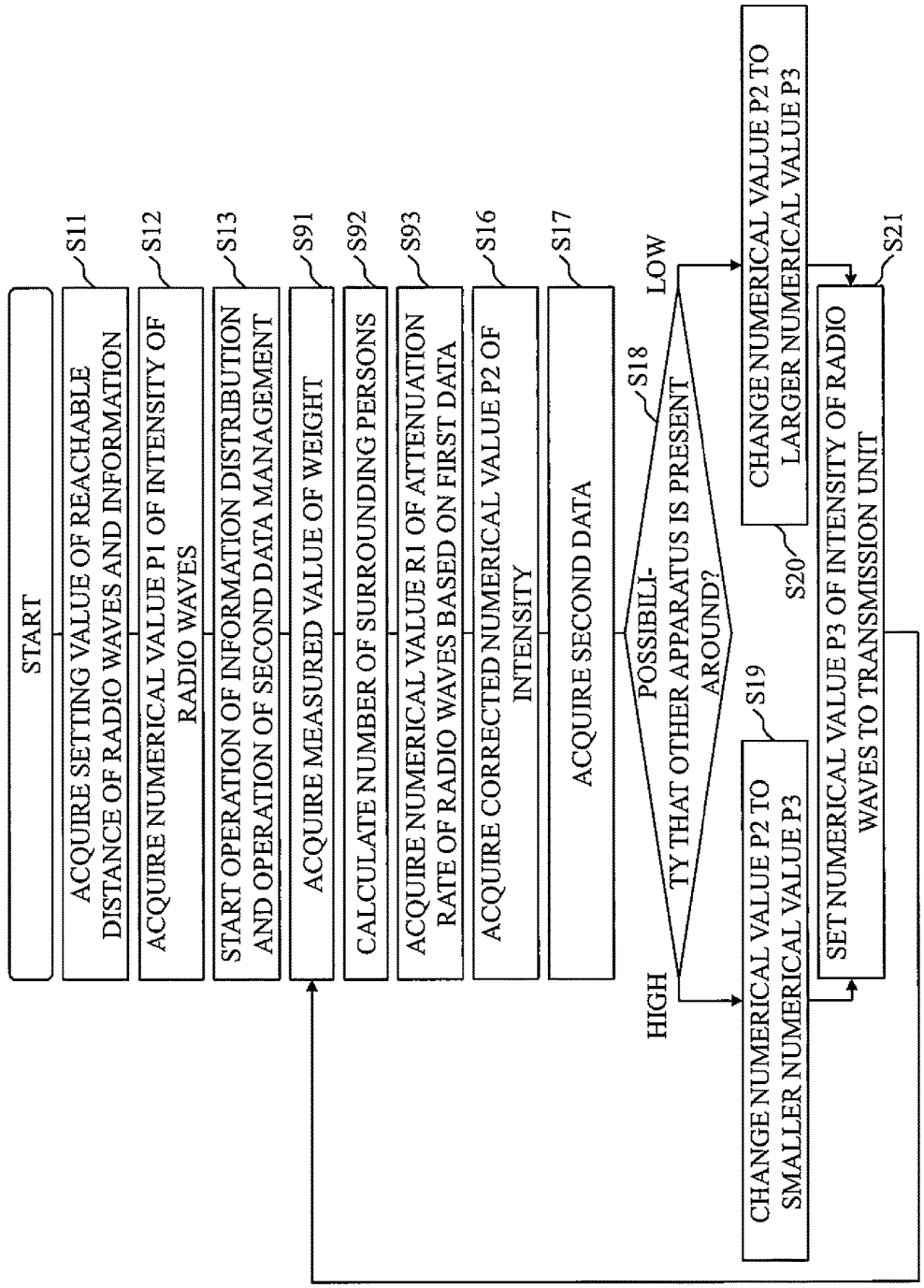
FIG. 17 is a flowchart illustrating an operation of control of the wireless information distribution apparatus according to the embodiment 6.

The operation illustrated in FIG. 17 is an operation of control in the present embodiment. The operation of control is equivalent to a control method for the wireless information distribution apparatus 100 according to the present embodiment and a processing procedure of a control program according to the present embodiment.

An operation in step S11 to step S13 illustrated in FIG. 17 is the same as that in the embodiment 1 illustrated in FIG. 4.

In the present embodiment, instead of an operation in step S14 and step S15 illustrated in FIG. 4, an operation in step S91 to step S93 is performed.

In step S91 illustrated in FIG. 17, the input unit 120 receives inputting of a measured value of weight from the weight sensor 603 via the input interface 103. The input unit 120 writes the input measured value in the storage unit 110.

In step S92 illustrated in FIG. 17, the calculation unit 190 performs a calculation of the number of persons present around the wireless information distribution apparatus 100 using the measured value of weight input from the weight sensor 603. Specifically, the calculation unit 190 reads the measured value input in step S91 from the storage unit 110. The calculation unit 190 calculates the number of persons present around the wireless information distribution apparatus 100 by dividing the read measured value by a mean human body weight previously stored in the storage unit 110. Then, the calculation unit 190 writes first data 310 indicating the calculated number of persons in the storage unit 110.

In step S93 illustrated in FIG. 17, the adjustment unit 150 acquires the first data 310. Specifically, the adjustment unit 150 reads the first data 310 indicating the number of persons, which is a result of the calculation in step S92, from the storage unit 110. Then, the adjustment unit 150 refers to the attenuation rate data 402 stored in the storage unit 110 and acquires a numerical value R1 of the attenuation rate of radio waves 210 corresponding to the number of persons indicated by the first data 310.

An operation in step S16 to step S21 illustrated in FIG. 17 is the same as that in the embodiment 1 illustrated in FIG. 4.

In the present embodiment, the first data 310 is data indicating the number of persons present around the wireless information distribution apparatus 100, but can be replaced with data indicating the density of persons present around the wireless information distribution apparatus 100. In that case, the attenuation rate data 402 is replaced with data indicating a relationship between the density of persons present around the wireless information distribution apparatus 100 and the attenuation rate of radio waves 210. In step S92, the calculation unit 190 performs a calculation of the density of persons present around the wireless information distribution apparatus 100. Specifically, the calculation unit 190 calculates the density of persons around the wireless information distribution apparatus 100 by calculating the number of persons around the wireless information distribution apparatus 100 using the measured value of weight in the above-mentioned method and dividing the calculated number of persons by the area of a range in which the weight is measured by the weight sensor 603, previously stored in the storage unit 110. In step S93, the adjustment unit 150 acquires first data 310 indicating the density of persons, which is a result of the calculation in step S92, refers to the attenuation rate data 402, and acquires a numerical value R1 of the attenuation rate of radio waves 210 corresponding to the density of persons indicated by the first data 310. The other operations are the same as those performed in a case where the first data 310 is data indicating the number of persons.

*Description of Advantageous Effects of Embodiment*

In the present embodiment, since the number of persons present around the wireless information distribution apparatus 100 is automatically calculated, the trouble of the user having to input the number of persons present around the wireless information distribution apparatus 100 can be saved.

*Other Configurations*

While, in the present embodiment, the function concerning control of the wireless information distribution apparatus 100 is implemented by software as in the embodiment 1, the function concerning control of the wireless information distribution apparatus 100 can be implemented by hardware as in the modification example of the embodiment 1. Alternatively, the function concerning control of the wireless information distribution apparatus 100 can be implemented by a combination of software and hardware.

While, in the present embodiment, the calculation unit 190 performs a calculation of the number of persons present around the wireless information distribution apparatus 100 using the measured value of weight input from the weight sensor 603, as a modification example, the calculation unit 190 can perform a calculation of the number of persons present around the wireless information distribution apparatus 100 using a different method. With regard to this modification example, differences thereof from the present embodiment are mainly described.

Figure 18:
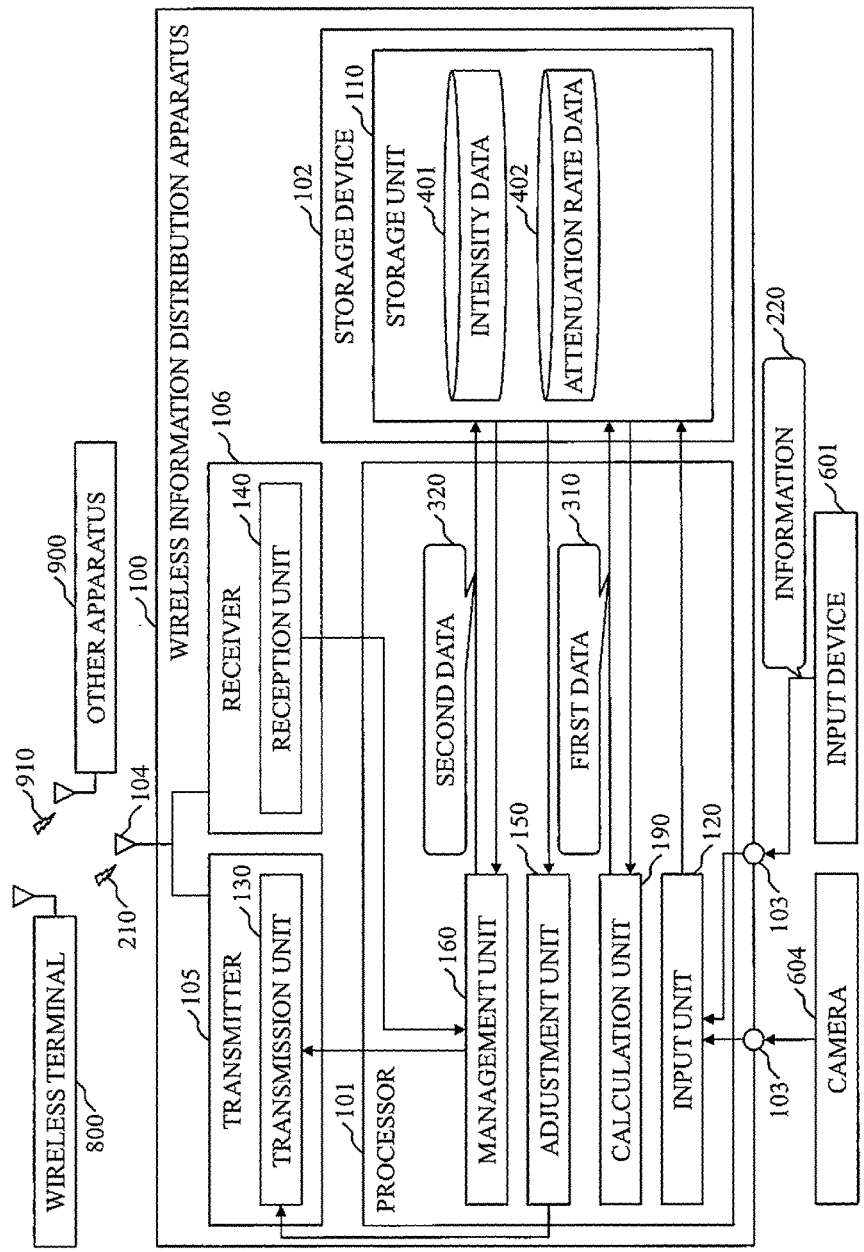
FIG. 18 is a block diagram illustrating a configuration of a wireless information distribution apparatus according to a modification example of the embodiment 6.

A configuration of the wireless information distribution apparatus 100 according to the modification example of the present embodiment is described with reference to FIG. 18.

The wireless information distribution apparatus 100 includes, as the input interface 103, a port which is connected to a camera 604, instead of a port which is connected to the weight sensor 603. The camera 604 photographs a place in which the wireless information distribution apparatus 100 is installed.

An operation of the wireless information distribution apparatus 100 according to the modification example of the present embodiment is described with reference to FIG. 17.

In this modification example, only step S91 and step S92 are the differences.

In step S91 illustrated in FIG. 17, the input unit 120 receives inputting of a photographed image from the camera 604 via the input interface 103. This image can be a still image or can be a moving image. The input unit 120 writes the input image in the storage unit 110.

In step S92 illustrated in FIG. 17, the calculation unit 190 performs a calculation of the number of persons present around the wireless information distribution apparatus 100 using the image input from the camera 604. Specifically, the calculation unit 190 reads the image input in step S91 from the storage unit 110. The calculation unit 190 counts the number of persons present around the wireless information distribution apparatus 100 by discriminating persons shown in the read image. Then, the calculation unit 190 writes first data 310 indicating the counted number of persons in the storage unit 110. In the present embodiment, as a method in which the calculation unit 190 discriminates persons shown in an image, a known method such as that disclosed in WO 2004/012142 is used.

The calculation unit 190 can perform a calculation of the number of persons present around the wireless information distribution apparatus 100 by counting the number of wireless terminals 800 identified by radio waves transmitted from wireless terminals 800 around the wireless information distribution apparatus 100, instead of using the weight sensor 603 as used in the present embodiment or using the camera 604 as used in the modification example. In that case, in step S91, the reception unit 140 receives radio waves from wireless terminals 800 around the wireless information distribution apparatus 100 via the antenna 104. In step S92, using the radio waves received in step S91, the calculation unit 190 identifies transmission sources of the received radio waves, and counts the number of identified wireless terminals 800. Specifically, the calculation unit 190 extracts identifiers for uniquely identifying respective wireless terminals 800, included in data transmitted by the received radio waves, and counts the number of different identifiers. In a case where wireless terminals 800 perform wireless communication in the Institute of Electrical and Electronics Engineers (IEEE) 802.11 method, media access control (MAC) addresses can be used as identifiers thereof. While the calculation unit 190 can treat the counted number directly as the number of persons, it is desirable that the calculation unit 190 more accurately estimate the number of persons by dividing the counted number by a penetration rate of terminals compliant with the IEEE 802.11 method previously stored in the storage unit 110.

While embodiments of the invention have been described above, some of these embodiments can be implemented in combination. Alternatively, any one or some of these embodiments can be partially implemented. Specifically, out of those described as "units" in the description of these embodiments, only any one can be employed or any optional combination of some units can be employed. Furthermore, the invention is not construed to be limited to these embodiments, but can be altered in various manners as appropriate.

REFERENCE SIGNS LIST

100: wireless information distribution apparatus, 101: processor, 102: storage device, 103: input interface, 104: antenna, 105: transmitter, 106: receiver, 109: processing circuit, 110: storage unit, 120: input unit, 130: transmission unit, 140: reception unit, 150: adjustment unit, 160: management unit, 170: identification unit, 180: detection unit, 190: calculation unit, 210: radio waves, 220: information, 310: first data, 320: second data, 321: radio wave data, 322: number-of-apparatuses data, 323: speed data, 324: location data, 325: state data, 401: intensity data, 402: attenuation rate data, 403: geographical data, 501: acceleration sensor, 502: GPS receiver, 601: input device, 602: opening and closing sensor, 603: weight sensor, 604: camera, 800: wireless terminal, 900: other apparatus, 910: radio waves.

The invention claimed is:

1. A wireless information distribution apparatus that distributes information to a surrounding wireless terminal by radio waves, the wireless information distribution apparatus comprising:
    a transmitter to transmit radio waves for distributing information; and
    processing circuitry
    to detect a speed of movement of the wireless information distribution apparatus, and
    to acquire first data indicating a degree in which a person is present around and second data including, as data serving as an index of a possibility that an other apparatus that distributes information by radio waves is present around, speed data indicating the detected speed, and to adjust, based on the first data and the second data, an intensity of radio waves to be transmitted by the transmitter.

2. The wireless information distribution apparatus according to claim 1, further comprising:
    a receiver to receive radio waves from the other apparatus,
    wherein the second data includes, as data serving as the index, radio wave data indicating whether radio waves from the other apparatus have been received by the receiver, and
    wherein the processing circuitry makes the intensity of radio waves to be transmitted by the transmitter lower in a case where the radio wave data indicates that radio waves from the other apparatus have been received than in a case where the radio wave data indicates that radio waves from the other apparatus are not received.

3. The wireless information distribution apparatus according to claim 1, further comprising:
    a receiver to receive radio waves from the other apparatus,
    wherein the processing circuitry identifies, based on radio waves received by the receiver, a transmission source of the received radio waves,
    wherein the second data includes, as data serving as the index, number-of-apparatuses data indicating a number of apparatuses each serving as the identified other apparatus, and
    wherein the processing circuitry makes the intensity of radio waves to be transmitted by the transmitter lower in a case where the number of apparatuses indicated by the number-of-apparatuses data is greater than a threshold value than in a case where the number of apparatuses is less than the threshold value.

4. The wireless information distribution apparatus according to claim 1,
    wherein the processing circuitry makes the intensity of radio waves to be transmitted by the transmitter lower in a case where the speed indicated by the speed data is lower than a threshold value than in a case where the speed is higher than the threshold value.

5. The wireless information distribution apparatus according to claim 1,
    wherein the processing circuitry makes the intensity of radio waves to be transmitted by the transmitter lower in a case where the speed indicated by the speed data is zero than in a case where the speed is not zero.

6. The wireless information distribution apparatus according to claim 1,
    wherein the processing circuitry stores geographical data indicating a geographical range in which the other apparatus is present,
    wherein the processing circuitry detects a location of the wireless information distribution apparatus,
    wherein the second data includes, as data serving as the index, location data indicating the detected location, and
    wherein the processing circuitry makes the intensity of radio waves to be transmitted by the transmitter lower in a case where the location indicated by the location data is within the geographical range indicated by the stored geographical data than in a case where the location is outside the geographical range.

7. The wireless information distribution apparatus according to claim 1,
    wherein the processing circuitry detects an opening or closing state of a partition used to close a space in which the wireless information distribution apparatus is installed,
    wherein the second data includes, as data serving as the index, state data indicating the opening or closing state detected, and
    wherein the processing circuitry makes the intensity of radio waves to be transmitted by the transmitter lower in a case where the opening or closing state indicated by the state data is an opening state than in a case where the opening or closing state is a closing state.

8. The wireless information distribution apparatus according to claim 1,
wherein the processing circuitry performs a calculation of a number of persons present around,
wherein the first data is data indicating, as the degree, a result of the performed calculation.

9. The wireless information distribution apparatus according to claim 1,
wherein the processing circuitry performs a calculation of a density of persons present around,
wherein the first data is data indicating, as the degree, a result of the performed calculation.

10. The wireless information distribution apparatus according to claim 8, wherein the processing circuitry performs the calculation using a measured value of weight input from a weight sensor located under a floor of a place in which the wireless information distribution apparatus is installed.

11. The wireless information distribution apparatus according to claim 8, wherein the processing circuitry performs the calculation using an image input from a camera that photographs a place in which the wireless information distribution apparatus is installed.

12. The wireless information distribution apparatus according to claim 8, wherein the processing circuitry performs the calculation by counting a number of wireless terminals that are identified by radio waves from surrounding wireless terminals.

13. A control method for a wireless information distribution apparatus that distributes information to a surrounding wireless terminal by radio waves, the control method comprising:
detecting a speed of movement of the wireless information distribution apparatus;
acquiring first data indicating a degree in which a person is present around the wireless information distribution apparatus and second data including, as data serving as an index of a possibility that an other apparatus that distributes information by radio waves is present around the wireless information distribution apparatus, speed data indicating the detected speed of the movement of the wireless information distribution apparatus; and
adjusting, based on the first data and the second data, an intensity of radio waves to be transmitted by the wireless information distribution apparatus.

14. A non-transitory computer readable medium storing a control program that causes a computer used to control a wireless information distribution apparatus that distributes information to a surrounding wireless terminal by radio waves to perform:
processing to detect a speed of movement of the wireless information distribution apparatus;
processing to acquire first data indicating a degree in which a person is present around the wireless information distribution apparatus and second data including, as data serving as an index of a possibility that an other apparatus that distributes information by radio waves is present around the wireless information distribution apparatus, speed data indicating the detected speed of the movement of the wireless information distribution apparatus; and
processing to adjust, based on the first data and the second data, an intensity of radio waves to be transmitted by the wireless information distribution apparatus.

15. The wireless information distribution apparatus according to claim 9, wherein the processing circuitry performs the calculation using a measured value of weight input from a weight sensor located under a floor of a place in which the wireless information distribution apparatus is installed.

16. The wireless information distribution apparatus according to claim 9, wherein the processing circuitry performs the calculation using an image input from a camera that photographs a place in which the wireless information distribution apparatus is installed.

17. The wireless information distribution apparatus according to claim 9, wherein the processing circuitry performs the calculation by counting a number of wireless terminals that are identified by radio waves from surrounding wireless terminals.

* * * * *